(12) United States Patent
Ohta

(10) Patent No.: US 6,813,096 B2
(45) Date of Patent: Nov. 2, 2004

(54) OPTICAL LENS AND OPTICAL INFORMATION RECORDING AND REPRODUCING APPARATUS EQUIPPED THEREWITH

(75) Inventor: Tatsuo Ohta, Hachioji (JP)

(73) Assignee: Konica Corporation, Tokyo (JP)

(*) Notice: Subject to any disclaimer, the term of this patent is extended or adjusted under 35 U.S.C. 154(b) by 15 days.

(21) Appl. No.: 10/290,347

(22) Filed: Nov. 8, 2002

(65) Prior Publication Data

US 2003/0103271 A1 Jun. 5, 2003

(30) Foreign Application Priority Data

Nov. 15, 2001 (JP) .......................... 2001/350466
Aug. 30, 2002 (JP) .......................... 2002/256049

(51) Int. Cl.$^7$ .......................... G02B 3/02; G02B 13/18; G02B 13/00; G02B 9/08; G11B 7/00
(52) U.S. Cl. .......................... 359/719; 359/722; 359/738; 369/44.32; 369/112.08
(58) Field of Search .......................... 359/637, 641, 359/718, 719, 738, 796, 722, 727; 369/112.01, 112.08, 112.21, 112.23, 112.26, 44.23, 44.32, 116

(56) References Cited

U.S. PATENT DOCUMENTS 6,388,822 B1 * 5/2002 Kitamura et al. ............ 359/719
2003/0095492 A1 * 5/2003 Nishino et al. ......... 369/112.08

FOREIGN PATENT DOCUMENTS

JP            403036501 A   *  2/1991    ............ G02B/1/00
JP            10160906      *  6/1998    ............ G02B/3/00

* cited by examiner

Primary Examiner—Georgia Epps
Assistant Examiner—Alicia M Harrington
(74) Attorney, Agent, or Firm—Finnegan, Henderson, Farabow, Garrett & Dunner, L.L.P.

(57) ABSTRACT

In an optical lens for use in an optical information recording and reproducing apparatus conducting at least one of recording information on an optical recording medium and reproducing of information recorded on the optical recording medium, by converging light on the optical recording medium, the optical lens includes: lens surfaces provided on both sides of the optical lens; and an antireflection coating provided on the lens surface on at least one side thereof. Thickness of the antireflection coating on a peripheral portion of the lens surface is greater than that of the antireflection coating provided on a center portion of the lens surface.

18 Claims, 7 Drawing Sheets

OPTICAL LENS AND OPTICAL INFORMATION RECORDING AND REPRODUCING APPARATUS EQUIPPED THEREWITH

BACKGROUND OF THE INVENTION

The present invention relates to an optical lens provided on an optical information recording and reproducing apparatus capable of conducting at least one of recording of information on an optical recording medium and reproducing of information recorded on an optical recording medium, and to an optical information recording and reproducing apparatus equipped with the optical lens mentioned above.

There has been known an optical pickup apparatus (optical information recording and reproducing apparatus) that conducts recording of information on an optical recording medium and reproducing of information recorded on an optical recording medium. In the optical pickup apparatus, a ray of light emitted from a semiconductor laser light source is converged on an information recording surface of an optical recording medium by an objective lens so that information may be recorded or reproduced.

In an objective lens of the optical pickup apparatus, there is provided an antireflection coating on the surface for improving efficiency of using light. Coating of the antireflection coating is conducted by, for example, a vacuum deposition method or a sputtering method. It has been common to form antireflection coating 11 so that its thickness may vary to be thinner as a position of that thickness is farther from center portion C toward peripheral portion P of objective lens 10, as shown in FIG. 8.

Further, thickness of the antireflection coating 11 at the center portion C is established so that reflectance on the center portion C of the objective lens 10 for light entering at an incident angle of 90° may show the minimum value. Namely, the thickness of the antireflection coating 11 is established so that an amount of light passing through the center portion C of the objective lens 10 may be the largest.

Incidentally, it is generally known that the thinner an antireflection coating is in thickness, the more a wavelength-dependence of reflectance for light is shifted to the shorter wave side. Further, in the antireflection coating, it is known that the greater an incident angle of light is, the more a wavelength-dependence of reflectance for light is shifted to the shorter wave side.

In the conventional objective lens 10, as stated above, antireflection coating 11 is thinner in thickness when a position of that thickness is farther from center portion C toward peripheral portion P of objective lens 10, and an incident angle of light is greater when a position of the incidence is farther from center portion C toward peripheral portion P.

In the conventional objective lens 10, therefore, the wavelength-dependence of reflectance for light on the peripheral portion P has been shifted more to the shorter wavelength side than that on the center portion C. Therefore, the wavelength for which the reflectance for light entering at the peripheral portion P shows the minimum value has been shorter than the wavelength for which the reflectance for light entering at the center portion C shows the minimum value.

Accordingly, in the aforementioned conventional objective lens 10, reflectance of peripheral portion P for a laser beam is higher, although that of central portion C for the laser beam is low, and therefore, an amount of light passing through the peripheral portion P has been less relatively, compared with an amount of light passing through the central portion C. Accordingly, there have been problems such as an increase of a beam spot diameter caused by a decline of converging power for light and a fall of an amount of light of a beam.

To solve these problems, it can be considered that the antireflection coating 11 on the peripheral portion P is made to be thick so that an amount of light passing through the peripheral portion P may be large. However, in this case, thickness of antireflection coating 11 on the center portion C is also increased together with an increase in thickness of the antireflection coating 11 on the peripheral portion P. Therefore, wavelength-dependency of reflectance on the center portion C for light entering at an incident angle of 90° is more shifted to the long wavelength side, and a wavelength becomes longer than that wherein reflectance shows the minimum value, which lowers an amount of light passing through the center portion C.

Namely, in the conventional objective lens 10, it was impossible to make reflectance on peripheral portion P for light entering obliquely to be small and to make reflectance on center portion C for light entering vertically to be small, at the same time, which has made it difficult to make both light-converging power and an amount of light to be optimum.

In recent years, it has been tried to make a diameter of an optical beam spot small, for a larger capacity of an optical recording medium, and as an example for that, a technology of a higher NA (Numerical Aperture) of an objective lens has been advanced. However, curvature of the lens surface of an objective lens having high NA is great, and therefore, an incident angle for light on the peripheral portion P of the lens is extremely large, and it is a remarkable tendency that thickness of the antireflection coating 11 on the peripheral portion P becomes smaller.

Due to this, an amount of light passing through the peripheral portion P is lowered extremely, and an increase of a spot diameter cannot be controlled despite an objective lens having high NA, resulting in an increase of cross talk and in deterioration of jitter characteristics, which has interfered with a large capacity of an optical recording medium.

SUMMARY OF THE INVENTION

With a background of the problems stated above, an object of the invention is to provide an optical lens wherein a spot diameter can be made small and an amount of light passing the optical lens can be secured, and an optical information recording and reproducing apparatus equipped with the optical lens.

In particular, the object of the invention is to provide an optical lens having an excellent light-converging characteristic and high NA, and to provide an optical information recording and reproducing apparatus wherein a large capacity of an optical recording medium can be realized.

To solve the problems mentioned above, Structure (1) of the invention is an optical lens that is provided on an optical information recording and reproducing apparatus capable of conducting at least one of recording information on an optical recording medium and reproducing of information recorded on an optical recording medium, by converging light on the optical recording medium, wherein an antireflection coating is provided on the lens surface on at least one side thereof, and the thickness of the antireflection coating on the peripheral portion of the lens surface is greater than that of the antireflection coating provided on the center portion of the lens surface.

In the invention described in Structure (1), it is possible to control so that wavelength-dependency of reflectance on the peripheral portion of the lens surface for light may be shifted less to the short wavelength side for wavelength-dependency of reflectance on the center portion of the lens surface, compared with the convention objective lens, because the thickness of the antireflection coating on the peripheral portion of the lens surface is greater than that of the antireflection coating provided on the center portion of the lens surface.

It is therefore possible to control so that reflectance of the peripheral portion of the lens surface for light may not become high even when thickness of the antireflection coating on the center portion is set so that reflectance on the center portion of the lens surface may be low, which is different from the conventional objective lens. It is therefore possible to prevent a fall of an amount of light passing through the peripheral portion of the lens, and to improve a light-converging power to make a spot diameter small and to secure an amount of light passing through the lens, compared with the past.

Structure (2) of the invention is the optical lens according to Structure (1), wherein when an angle formed by a normal line at a certain position on the lens surface where the antireflection coating is provided and by an optical axis is represented by $\theta$, thickness of the antireflection coating on the peripheral portion of the lens surface on which the angle $\theta$ is 45° or more is greater than that on the center portion of the lens surface on which the angle $\theta$ is 0°.

The "center portion" described in Structure (2) means a portion where angle $\theta$ on an optical functional surface on the lens surface is 0°, while, the "peripheral portion" means a portion where angle $\theta$ on an optical functional surface on the lens surface is not 0°. With respect to this point, when the peripheral portion is specified in the following Structures to have angle $\theta$ of not less than 45° or angle $\theta$ of not less than 50°, the "Peripheral portion" means a portion of the optical functional surface on the lens surface satisfying the aforementioned condition.

In the invention described in Structure (2), it is possible to prevent a fall of an amount of light passing through the peripheral portion of the lens surface where the angle $\theta$ is not less than 45°. Therefore, it is possible to improve light-converging characteristics more in the optical lens that has the lens surface on which the angle $\theta$ is relatively great and has high NA, and thereby to contribute to realization of a large capacity of an optical recording medium.

Structure (3) of the invention is the optical lens according to Structure (1) or Structure (2), wherein, thickness of the antireflection coating is established so that a wavelength wherein reflectance for light entering at angle 0° for the antireflection coating on the peripheral portion of the lens surface shows the minimum value is equal to or greater than a wavelength wherein reflectance for light entering at angle 0° for the antireflection coating on the center portion of the lens surface shows the minimum value.

"Equal to or more than a wavelength" described in Structure (3) means to be equal to or greater than the wavelength, and "reflectance for light entering at angle 0°" shows reflectance in the occasion wherein light is made to enter at angle 0° to the antireflection coating for the purpose of measuring reflectance, which also applies to the following Structures.

In the invention according to Structure (3), a wavelength wherein reflectance for light entering at angle 0° to the antireflection coating on the peripheral portion of the lens surface shows the minimum value is equal to or greater than a wavelength wherein reflectance for light entering at angle 0° to the antireflection coating on the center portion of the lens surface shows the minimum value.

It is therefore possible to control surely so that wavelength-dependency of reflectance on the peripheral portion of the lens surface for light entering obliquely may be shifted less to the short wavelength side, for wavelength-dependency of reflectance on the center portion of the lens surface for light entering vertically. It is therefore possible to prevent surely a fall of an amount of light passing through the peripheral portion of the lens, and to make a spot diameter small to secure an amount of light passing through the lens.

Structure (4) of the invention is the optical lens according to either one of Structure (1)–Structure (3), wherein thickness of the antireflection coating is established so that a wavelength wherein reflectance for light entering the antireflection coating on at least a part of the peripheral portion of the lens surface at angle 0° shows the minimum value may be the same as a wavelength wherein reflectance for light entering the antireflection coating on the center portion of the lens surface at angle 0° shows the minimum value.

In the invention according to Structure (4), a wavelength wherein reflectance for light entering at angle 0° to the antireflection coating on at least a part of the peripheral portion of the lens surface shows the minimum value is the same as a wavelength wherein reflectance for light entering at angle 0° to the antireflection coating on the center portion of the lens surface shows the minimum value. In other words, it is prevented that wavelength-dependence of reflectance for light entering a peripheral portion of the lens surface obliquely is shifted greatly toward the short wavelength side, compared with wavelength-dependence of reflectance for light entering a center portion of the lens surface vertically.

It is therefore possible to control reflectance on the peripheral portion of the lens surface for light to be as low as that on the center portion of the lens surface. Thus, an amount of light passing through a peripheral portion of the lens can be made as large as that of light passing through the center portion of the lens, which makes an amount of light passing through the total lens to be increased greatly.

Structure (5) of the invention is the optical lens according to either one of Structures (1)–(4), that is provided on an optical information recording and reproducing apparatus equipped with a laser light source having at least one kind of wavelength in a wavelength range of 630–680 nm, and converges light emitted from the laser light source on an optical recording medium, wherein an antireflection coating is provided on the lens surface on the side where light emitted from the laser light source enters, and thickness of the antireflection coating is established so that reflectance for light entering, at angle 0°, the peripheral portion of the lens surface where angle $\theta$ is 45° or more may show the minimum value within a range of 630–800 nm, when $\theta$ represents an angle formed by a normal line at a certain position on the lens surface on the side where light emitted from the laser light source enters and by an optical axis.

In the invention according to Structure (5), more light emitted from the laser light source having at least one kind of wavelength in a wavelength range of 630–680 nm can pass through the peripheral portion of the lens, compared with the past, because thickness of the antireflection coating is established as described above.

Structure (6) of the invention is the optical lens according to Structure (5), wherein thickness of the antireflection coating provided on the lens surface on the side where light emitted from the laser light source enters is established so that reflectance for light entering, at an angle of 0°, the center portion of the lens surface having angle θ of 0° may show the minimum value within a wavelength range of 580–740 nm.

Structure (7) of the invention is the optical lens according to Structure (5) or Structure (6), wherein an antireflection coating is provided on the lens surface on the side from which the light emerges to an optical recording medium, and thickness of the antireflection coating is established so that reflectance for light entering, at angle 0°, the center portion of the lens surface where angle θ is 0° may show the minimum value within a range of 630–800 nm, when θ represents an angle formed by a normal line at a certain position on the lens surface on the side from which the light emerges and by an optical axis.

In the invention according to each of Structure (6) and Structure (7), it is possible to secure a relatively large amount of light that is emitted from the laser light source having at least one kind of wavelength in a wavelength range of 630–680 nm and passes through the center portion of the lens because thickness of each of the antireflection coatings is established as stated above.

Structure (8) of the invention is the optical lens according to either one of Structure (5)–Structure (7), that is provided on an optical information recording and reproducing apparatus equipped with a laser light source having at least one kind of wavelength in a wavelength range of 630–650 nm, and converges light emitted from the laser light source on an optical recording medium, wherein an antireflection coating is provided on the lens surface on the side where light emitted from the laser light source enters, and thickness of the antireflection coating is established so that reflectance for light entering, at angle 0°, the peripheral portion of the lens surface where angle θ is 45° or more may show the minimum value within a range of 660–770 nm, and reflectance for light entering, at angle 0°, the center portion of the lens surface where angle θ is 0° may show the minimum value within a range of 600–700 nm, when θ represents an angle formed by a normal line at a certain position on the lens surface on the side where light emitted from the laser light source enters and by an optical axis, and an antireflection coating is provided on the lens surface on the side from which the light emerges, and thickness of the antireflection coating is established so that reflectance for light entering, at angle 0°, the center portion of the lens surface where angle θ is 0° may show the minimum value within a range of 640–740 nm.

In the invention according to Structure (8), it is possible to make an amount of light that is emitted from the laser light source having at least one kind of wavelength in a wavelength range of 630–650 nm and passes through the peripheral portion of the lens to be more, and to secure more amount of light being emitted from the laser light source and passing through the center portion of the lens, because thickness of each of the antireflection coatings is established as described above.

Structure (9) of the invention is the optical lens according to Structure (8), wherein an antireflection coating is provided on the lens surface on the side where the light emitted from the laser light source enters, and thickness of the antireflection coating is established so that reflectance for light entering, at angle 0°, the peripheral portion of the lens surface where angle θ is 50° or more may show the minimum value within a range of 670–770 nm, when θ represents an angle formed by a normal line at a certain position on the lens surface on the side where the light emitted from the laser light source enters and by an optical axis.

In the invention according to Structure (9), it is possible to make an amount of light that is emitted from the laser light source having at least one kind of wavelength in a wavelength range of 630–650 nm and passes through the peripheral portion of the lens surface where angle θ is 50° or more to be more, because thickness of each of the antireflection coatings is established as described above. Therefore, it is possible to improve light-converging characteristics more in the optical lens having high NA in which the angle θ is extremely great, and thereby to contribute to realization of a large capacity of an optical recording medium.

Structure (10) of the invention is the optical lens according to either one of Structure (5)–Structure (7), that is provided on an optical information recording and reproducing apparatus equipped with a laser light source having at least one kind of wavelength in a wavelength range of 650–670 nm, and converges light emitted from the laser light source on an optical recording medium, wherein an antireflection coating is provided on the lens surface on the side where light emitted from the laser light source enters, and thickness of the antireflection coating is established so that reflectance for light entering, at angle 0°, the peripheral portion of the lens surface where angle θ is 45° or more may show the minimum value within a range of 660–800 nm, and reflectance for light entering, at angle 0°, the center portion of the lens surface where angle θ is 0° may show the minimum value within a range of 610–740 nm, when θ represents an angle formed by a normal line at a certain position on the lens surface on the side where light emitted from the laser light source enters and by an optical axis, and an antireflection coating is provided on the lens surface on the side from which the light emerges, and thickness of the antireflection coating is established so that reflectance for light entering, at angle 0°, the center portion of the lens surface where angle θ is 0° may show the minimum value within a range of 660–740 nm.

In the invention according to Structure (10), it is possible to make an amount of light that is emitted from the laser light source having at least one kind of wavelength in a wavelength range of 650–670 nm and passes through the peripheral portion of the lens to be more, and to secure more amount of light being emitted from the laser light source and passing through the center portion of the lens, because thickness of each of the antireflection coatings is established as described above.

Structure (11) of the invention is the optical lens according to Structure (10), wherein an antireflection coating is provided on the lens surface on the side where the light emitted from the laser light source enters, and thickness of the antireflection coating is established so that reflectance for light entering, at angle 0°, the peripheral portion of the lens surface where angle θ is 50° or more may show the minimum value within a range of 700–800 nm, when θ represents an angle formed by a normal line at a certain position on the lens surface on the side where the light emitted from the laser light source enters and by an optical axis.

In the invention according to Structure (11), it is possible to make an amount of light that is emitted from the laser light source having at least one kind of wavelength in a wavelength range of 650–670 nm and passes through the peripheral portion of the lens surface where angle θ is 50° or more to be more, because thickness of each of the antireflection coatings is established as described above. Therefore, it is possible to improve light-converging characteristics more in the optical lens having high NA in which the angle θ is extremely great, and thereby to contribute to realization of a large capacity of an optical recording medium.

Structure (12) of the invention is the optical lens according to either one of Structure (1)–Structure (4), that is provided on an optical information recording and reproducing apparatus equipped with a laser light source having at least one kind of wavelength in a wavelength range of 400–450 nm, and converges light emitted from the laser light source on an optical recording medium, wherein an antireflection coating is provided on the lens surface on the side where light emitted from the laser light source enters, and thickness of the antireflection coating is established so that reflectance for light entering, at angle 0°, the peripheral portion of the lens surface where angle θ is 45° or more may show the minimum value within a range of 420–520 nm.

In the invention according to Structure (12), it is possible to make an amount of light that is emitted from the laser light source having at least one kind of wavelength in a wavelength range of 400–450 nm and passes through the peripheral portion of the lens to be more, compared with the past, because thickness of the antireflection coating is established as described above.

Structure (13) of the invention is the optical lens according to Structure (12), wherein thickness of the antireflection coating provided on the lens surface on the side where light emitted from the laser light source enters is established so that reflectance for light entering, at an angle of 0°, the center portion of the lens surface having angle θ of 0° may show the minimum value within a wavelength range of 380–490 nm.

Structure (14) of the invention is the optical lens according to Structure (12) or Structure (13), wherein an antireflection coating is provided on the lens surface on the side from which the light emerges to an optical recording medium, and thickness of the antireflection coating is established so that reflectance for light entering, at angle 0°, the center portion of the lens surface where angle θ is 0° may show the minimum value within a range of 400–490 nm, when θ represents an angle formed by a normal line at a certain position on the lens surface on the side from which the light emerges and by an optical axis.

In the invention according to Structure (13) and Structure (14), it is possible to secure a relatively large amount of light that is emitted from the laser light source having at least one kind of wavelength in a wavelength range of 400–450 nm and passes through the center portion of the lens, because thickness of each of the antireflection coatings is established as stated above.

Structure (15) of the invention is the optical lens according to either one of Structure (12)–Structure (14), that is provided on an optical information recording and reproducing apparatus equipped with a laser light source having at least one kind of wavelength in a wavelength range of 400–420 nm, and converges light emitted from the laser light source on an optical recording medium, wherein with respect to an antireflection coating provided on the lens surface on the side where light emitted from the laser light source enters, thickness of the antireflection coating is established so that reflectance for light entering, at angle 0°, the peripheral portion of the lens surface where angle θ is 45° or more may show the minimum value within a range of 420–490 nm, and reflectance for light entering, at angle 0°, the center portion of the lens surface where angle θ is 0° may show the minimum value within a range of 380–440 nm, when θ represents an angle formed by a normal line at a certain position on the lens surface on the side where light emitted from the laser light source enters and by an optical axis, and with respect to an antireflection coating provided on the lens surface on the side from which the light emerges, thickness of the antireflection coating is established so that reflectance for light entering, at angle 0°, the center portion of the lens surface where angle θ is 0° may show the minimum value within a range of 400–490 nm.

In the invention according to Structure (15), it is possible to make an amount of light that is emitted from the laser light source having at least one kind of wavelength in a wavelength range of 400–420 nm and passes through the peripheral portion of the lens to be more, and to secure more amount of light being emitted from the laser light source and passing through the center portion of the lens, because thickness of each of the antireflection coatings is established as described above.

Structure (16) of the invention is the optical lens according to Structure (15), wherein an antireflection coating is provided on the lens surface on the side where the light emitted from the laser light source enters, and thickness of the antireflection coating is established so that reflectance for light entering, at angle 0°, the peripheral portion of the lens surface where angle θ is 50° or more may show the minimum value within a range of 430–490 nm, when θ represents an angle formed by a normal line at a certain position on the lens surface on the side where the light emitted from the laser light source enters and by an optical axis.

In the invention according to Structure (16), it is possible to make an amount of light that is emitted from the laser light source having at least one kind of wavelength in a wavelength range of 400–420 nm and passes through the peripheral portion of the lens surface where angle θ is 50° or more to be more, because thickness of each of the antireflection coatings is established as described above. Therefore, it is possible to improve light-converging characteristics more in the optical lens having high NA in which the angle θ is extremely great, and thereby to contribute to realization of a large capacity of an optical recording medium.

Structure (17) of the invention is the optical lens according to either one of Structure (1)–Structure (16), wherein thickness of the antireflection coating on the peripheral portion of the lens surface is (1–1.5) times that of the antireflection coating on the center portion of the lens surface.

In the invention according to Structure (17), it is possible to control a change in a lens form caused by an antireflection coating to be relatively less, because thickness of the antireflection coating on the peripheral portion of the lens surface is (1–1.5) times that of the antireflection coating on the center portion of the lens surface.

Incidentally, to keep a change in a lens form caused by an antireflection coating to be more less, it is more preferable that thickness of the antireflection coating on the peripheral portion of the lens surface is (1–1.2) times that of the antireflection coating on the center portion of the lens surface.

Structure (18) of the invention is an optical information recording and reproducing apparatus that is provided with a laser light source and the optical lens according to either one of Structure (1)–Structure (17), and is capable of conducting at least one of recording information on an optical recording medium and reproducing information recorded on an optical recording medium, by converging light emitted from the laser light source on an optical recording medium with the optical lens.

In the invention according to Structure (18), a light spot diameter is made to be smaller, compared with the past, and more amount of light passing through the lens can be secured, because the light emitted from the laser light source is converged on an optical recording medium by the optical lens.

It is therefore possible to record information on an optical recording medium on a higher density basis and to reproduce information from the optical recording medium on which information is recorded on a high density basis, compared with the past, thus, a large capacity of the optical recording medium can be realized.

DETAILED DESCRIPTION OF THE PREFERRED EMBODIMENT

Figure 1:
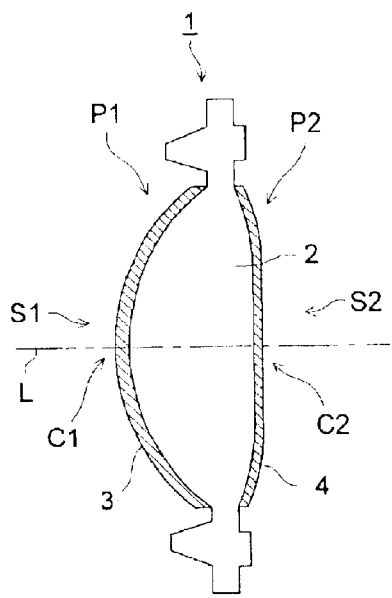
FIG. 1(a) is a schematic longitudinal section showing a lens representing an embodiment of the optical lens of the invention.
FIG. 1(b) is a schematic longitudinal section showing a lens representing another embodiment of the optical lens of the invention.
Figure 1:
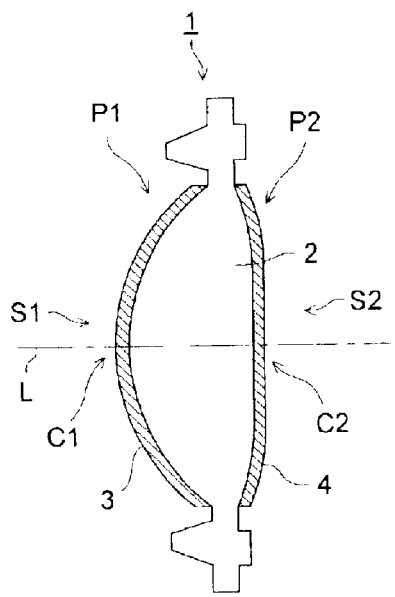

An embodiment of the invention will be explained as follows, referring to the drawings.

Lens 1 (FIG. 1(a), FIG. 1(b)) representing an embodiment of the optical lens of the invention is one used as an objective lens of an optical pickup apparatus (optical information recording and reproducing apparatus) capable of conducting recording of information on an optical recording medium and reproducing of information recorded on an optical recording medium.

The optical pickup apparatus is provided with a semiconductor laser light source and lens 1. The lens 1 is incorporated in the optical pickup apparatus, with its lens surface having greater curvature among two lens surfaces S1 and S2 facing to the semiconductor laser light source side. A laser beam emitted from the semiconductor laser light source is converted into a collimated light, then, enters the lens 1 from the lens surface S1 side and emerges from the lens surface S2 side to be converged on an information recording surface of the optical recording medium that conducts recording and reproducing of information.

In information reproducing conducted by the optical pickup apparatus, a laser beam is converged by the lens 1 on an information recording surface of the optical recording medium, and an amount of light reflected on the information recording surface is detected. Based on the amount of light thus detected, information recorded on the optical recording medium can be reproduced.

In information recording conducted by the optical pickup apparatus, a laser beam having high intensity is converged by the lens 1 on an information recording surface of the optical recording medium so that reaction may take place on the information recording surface. Due to this, the information can be recording on the optical recording medium.

Incidentally, since the structure of the optical pickup apparatus excluding the lens 1, is the same as that of the optical pickup apparatus which has been known widely, detailed explanation thereof will be omitted here.

As shown in FIGS. 1(a) and 1(b), lens 1 is composed of base material 2 and antireflection coatings (antireflection layers) 3 and 4 provided respectively on lens surfaces S1 and S2. In FIGS. 1(a) and 1(b), in this case, there are illustrated two (FIG. 1(a) and FIG. 1(b)) embodiments of the optical lens of the invention.

Figure 2:
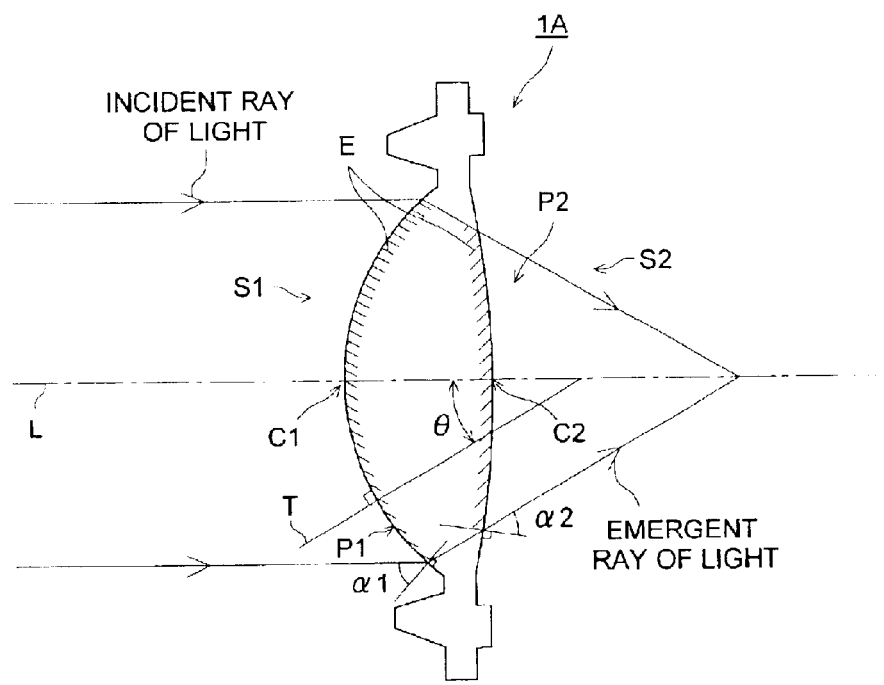
FIG. 2 is a diagram showing angle θ formed by an optical axis and the lens surface in lens 1A that is an example of the lens in FIG. 1(a) and FIG. 1(b) and has a curved surface.
Figure 3:
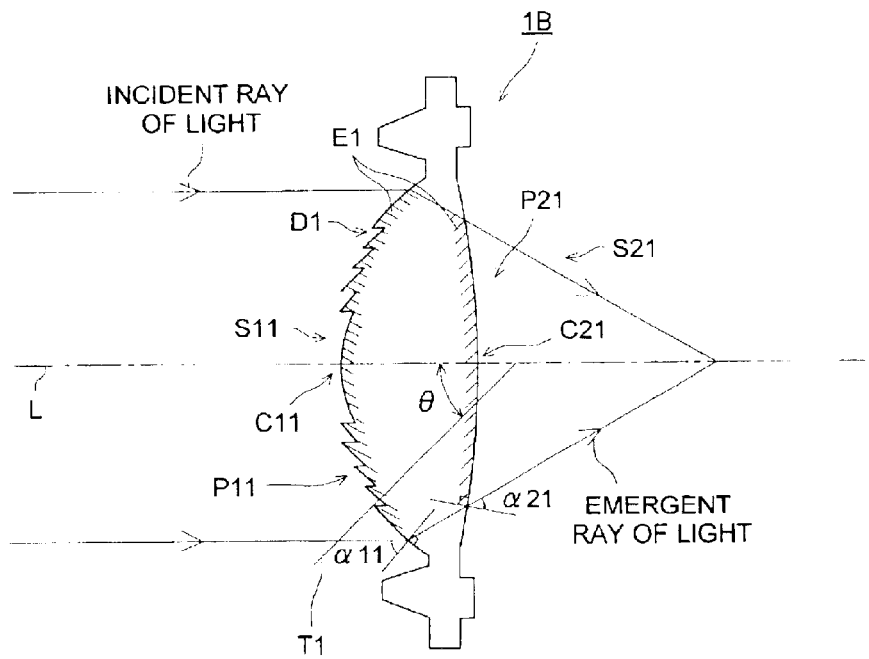
FIG. 3(a) is a diagram showing angle θ formed by an optical axis and the lens surface in lens 1B that is an example of the lens in FIG. 1(a) and FIG. 1(b) and is equipped with a serrated diffractive structure.
FIG. 3(b) is a diagram showing angle θ formed by an optical axis and the lens surface in lens 1C that is an example of the lens in FIG. 1(a) and FIG. 1(b) and is equipped with a step-formed diffractive structure.
Figure 3:
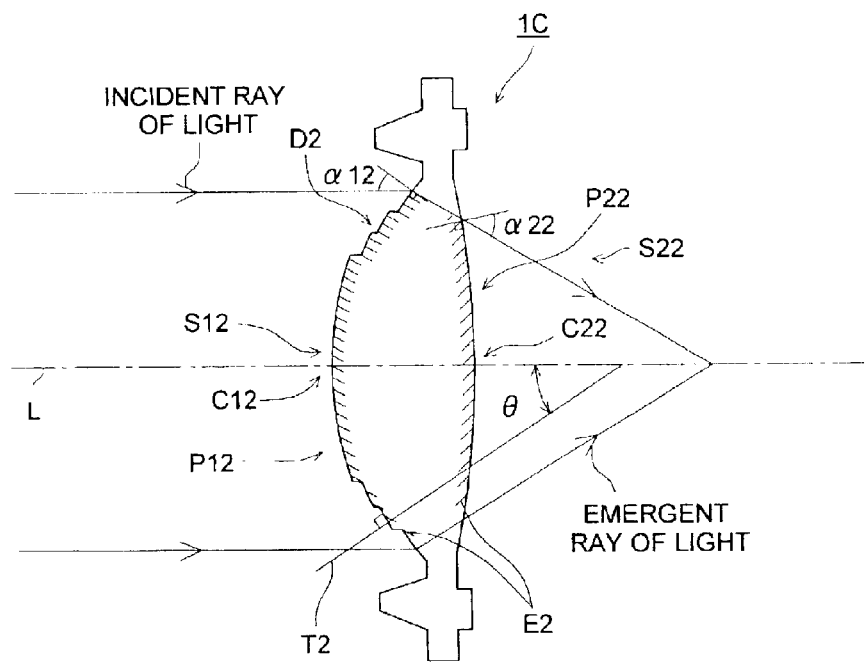

In FIG. 2, lens 1A that has a curved surface is illustrated as an example of the lens 1 in FIG. 1(a) and FIG. 1(b), lens 1B that is provided with a serrated diffractive structure is illustrated in FIG. 3(a) as an example of the lens 1 in FIG. 1(a) and FIG. 1(b), and FIG. 3(b) illustrates lens 1C that is equipped with a step-formed diffractive structure as an example of the lens 1 in FIG. 1(a) and FIG. 1(b). However, in FIG. 2 and FIGS. 3(a) and 3(b), antireflection coatings 3 and 4 are omitted.

As is shown in FIG. 2, in lens 1A having a curved surface representing an example of lens 1, let is be assumed that center portion C1 of lens surface S1 is a portion where angle θ formed by normal line T on its surface and by an optical axis L is 0° at a certain position on a light incident surface within effective surface E where an optical function of lens surface S1 is effective. In the same way, let is be assumed that center portion C2 of lens surface S2 is a portion where angle θ formed by normal line T on its surface and by an optical axis L is 0° at a certain position on a light incident surface within effective surface E where an optical function of lens surface S2 is effective.

Further, peripheral portion P1 of lens surface S1 is assumed to be a portion of effective surface E where the angle θ is not 0°. However, when the peripheral portion P1 is specified so that the angle θ is not less than 45° or not less than 50°, the peripheral portion P1 is assumed to be a portion of effective surface E where the angle is the specified angle or more.

Equally, peripheral portion P2 of lens surface S2 is assumed to be a portion of effective surface E where the angle θ is not 0°. However, when the peripheral portion P2 is specified so that the angle θ is not less than 45° or not less than 50°, the peripheral portion P2 is assumed to be a portion of effective surface E where the angle is the specified angle or more.

An incident ray of light to lens surface S1 is assumed to be almost in parallel with optical axis 1.

Light incident angle α1 is assumed to be an angle formed by an incident ray of light and by a normal line on lens surface S1, and light emergent angle α2 is assumed to be an angle formed by an emergent ray of light and by a normal line on lens surface S1. A ray of light that is emitted from the laser light source and enters lens surface S1 is assumed to be an incident ray of light, and a ray of light that emerges from lens surface S2 and is projected on an unillustrated information recording surface of an optical recording medium is assumed to an incident ray of light.

As shown in FIG. 3(a), in lens 1B that is an example of lens 1 and is equipped with a serrated diffractive structure, lens surfaces S11 and S21, center portions C11 and C21, peripheral portions P11 and P21, light incident angle α11, light emergent angle α21, angle θ, effective surface E1 and normal line T1 are defined to be the same respectively as lens surfaces S1 and S2, center portions C1 and C2, peripheral portions P1 and P2, light incident angle α1, light emergent angle α2, angle θ, effective surface E and normal line T in FIG. 2. However, step portion D1 of the serrated diffractive structure is not made to be a certain position on the lens surface S11 for specifying angle θ, and it is assumed to define angle θ that is formed by normal line T1 on a certain position on effective surface E1 excluding the step portion D1 and by optical axis L.

As shown in FIG. 3(b), in lens 1C that is an example of lens 1 and is equipped with a step-formed diffractive structure, lens surfaces S12 and S22, center portions C12 and C22, peripheral portions P12 and P22, light incident angle α12, light emergent angle α22, angle θ, effective surface E2 and normal line T2 are defined to be the same as lens surfaces S1 and S2, center portions C1 and C2, peripheral portions P1 and P2, light incident angle α1, light emergent angle α2, angle θ, effective surface E and normal line T in FIG. 2. However, step portion D2 of the step-formed diffractive structure is not made to be a certain position on the lens surface S11 for specifying angle θ, and it is assumed to define angle θ that is formed by normal line T2 on a certain position on effective surface E2 excluding the step portion D2 and by optical axis L.

An incident ray of light to each of lens surfaces S11 and S12 is assumed to be almost in parallel with optical axis 1.

Owing to the diffractive structure provided on each of lens 1B and lens 1C, it is possible to obtain a temperature compensation function that reduces focus deviation that is caused by changes in wavelength of an incident light originated from temperature changes and by changes in refractive index of a lens, and to obtain a mode hop compensation function that reduces focus deviation that is caused by changes in wavelength of an incident light originated from a mode hop of a laser light source.

Since the occasion wherein the embodiment described as follows is applied on each of lens 1B and lens 1C both being provided respectively with a serrated diffractive structure and with a step-formed diffractive structure shown respectively in FIG. 3(a) and FIG. 3(b) is the same in terms of principle as the occasion wherein the embodiment is applied on lens 1A having a curved surface shown in FIG. 2, the lens 1A having a curved surface shown in FIG. 2 will be explained as follows as a representative. Incidentally, the center portion, the peripheral portion, the light incident angle, a light reflection angle and the angle θ are also established equally in the case of the structure having a step for giving an optical path difference by providing a phase difference on an incident light.

The base material 2 is composed, for example, of a plastic material, a glass material or of a complex thereof. The plastic material is one that is made concretely of a transparent resin material such as, for example, acrylic resin, polycarbonate resin and polyolefin resin (Zeonex resin made by Nippon Zeon Co., Ltd.). As the glass material, there is used optical glass which has been known widely.

The base material 2 is processed through injection molding of plastic materials, forming by mold for glass, grinding processing, or cutting processing, to be manufactured.

Incidentally, a surface treatment layer such as a protective layer or a subbing layer may also be provided between base material 2 and each of antireflection coatings 3 and 4, which, however, is not illustrated in FIGS. 1(a) and 1(b).

Each of the antireflection coatings 3 and 4 is formed in a laminated shape, and it is structured to be provided with a first layer that is placed on the surface of the base material 2 and a second layer that is provided on the first layer. The first layer is made of a material whose refractive index is higher than that of the material for the second layer.

To be concrete, there are given, for example, cerium oxide, titanium oxide, tantalum oxide, zirconium oxide and silicon oxide, as a material with high refractive index which constitutes the first layer. Further, there are given, for example, silicon oxide and magnesium fluoride, as a material with low refractive index which constitutes the second layer.

In lens 1 of the embodiment shown in FIG. 1(a), thickness of antireflection coating 3 is almost uniform even at center portion C1 and peripheral portion P1 of lens surface S1. Further, thickness of antireflection coating 4 is almost uniform even at center portion C2 and peripheral portion P2 of lens surface S2.

In lens 1 of another embodiment shown in FIG. 1(b), thickness of antireflection coating 3 is formed to become thicker as a position corresponding to the thickness moves from center portion C1 to peripheral portion P1 on the lens surface S1. On the lens surface S2, thickness of antireflection coating 4 is formed to become thicker as a position corresponding to the thickness moves from center portion C2 to peripheral portion P2.

Now, it is preferable that thickness of antireflection coating 3 is established so that a wavelength in which the reflectance for light entering antireflection coating 3 on peripheral portion P1 at angle 0° shows the minimum value may be greater than that in which the reflectance for light entering antireflection coating 3 on center portion C1 at angle 0° shows the minimum value.

Further, it is preferable that thickness of antireflection coating 3 is established so that a wavelength in which the reflectance for light entering antireflection coating 3 on at lease a part of peripheral portion P1 at angle 0° shows the minimum value may be equal to that in which the reflectance for light entering antireflection coating 3 on center portion C1 at angle 0° shows the minimum value.

It is preferable that thickness of antireflection coating 4 is established so that a wavelength in which the reflectance for light entering antireflection coating 4 on peripheral portion P2 at angle 0° shows the minimum value may be greater than that in which the reflectance for light entering antireflection coating 4 on center portion C2 at angle 0° shows the minimum value.

When a wavelength of a laser beam emitted from a semiconductor laser light source of an optical pickup apparatus is at least one wavelength within a range of 630–680 nm, it is preferable that thickness of antireflection coating 3 is established so that the reflectance of the light entering, at angle 0°, antireflection coating 3 on peripheral portion P1 where the angle θ is not less than 45° may show the minimum value within a wavelength range of 630–800 nm. It is extremely preferable that thickness of antireflection coating 3 is established so that the reflectance of the aforementioned light may show the minimum value within a wavelength range of 660–775 nm.

It is preferable that thickness of antireflection coating 3 is established so that reflectance of light entering, at angle 0°, antireflection coating 3 on center portion C1 where the angle θ is 0° may show the minimum value within a wavelength range of 580–740 nm. Further, it is extremely preferable that thickness of antireflection coating 3 is established so that reflectance of the aforementioned light may show the minimum value within a wavelength range of 610–690 nm.

Further, it is preferable that thickness of antireflection coating 4 is established so that reflectance of light entering, at angle of 0°, antireflection coating 4 on center portion C2 where the angle θ is 0° may show the minimum value within a range of 630–800 nm. Further, it is more preferable that thickness of antireflection coating 4 is established so that reflectance of the aforementioned light may show the minimum value within a wavelength range of 640–740 nm.

In particular, when a wavelength of a laser beam emitted from a semiconductor laser light source of an optical pickup apparatus is at least one wavelength within a range of 630–650 nm, it is preferable that thickness of antireflection coating 3 is established so that the reflectance for the light entering, at angle 0°, antireflection coating 3 on peripheral portion P1 where the angle θ is not less than 45° may show the minimum value within a wavelength range of 660–770 nm.

It is preferable that thickness of antireflection coating 3 is established so that reflectance of light entering, at angle 0°, antireflection coating 3 on center portion C1 where the angle θ is 0° may show the minimum value within a wavelength range of 600–700 nm.

It is preferable that thickness of antireflection coating 4 is established so that reflectance for light entering, at angle 0°, antireflection coating 4 on center portion C2 where the angle θ is 0° may show the minimum value within a wavelength range of 640–740 nm.

It is preferable that thickness of antireflection coating 3 is established so that reflectance for light entering, at angle 0°, antireflection coating 3 on peripheral portion P1 where the angle θ is not less than 50° may show the minimum value within a wavelength range of 670–770 nm.

Further, when a wavelength of a laser beam emitted from a semiconductor laser light source of an optical pickup apparatus is at least one wavelength within a range of 650–670 nm, it is preferable that thickness of antireflection coating 3 is established so that the reflectance for the light entering, at angle 0°, antireflection coating 3 on peripheral portion P1 where the angle θ is not less than 45° may show the minimum value within a wavelength range of 660–800 nm.

It is preferable that thickness of antireflection coating 4 is established so that reflectance of light entering, at angle 0°, antireflection coating 3 on center portion C1 where the angle θ is 0° may show the minimum value within a wavelength range of 610–740 nm.

It is preferable that thickness of antireflection coating 4 is established so that reflectance for light entering, at angle 0°, antireflection coating 4 on center portion C2 where the angle θ is 0° may show the minimum value within a wavelength range of 660–740 nm.

It is preferable that thickness of antireflection coating 3 is established so that reflectance for light entering, at angle 0°, antireflection coating 3 on peripheral portion P1 where the angle θ is not less than 50° may show the minimum value within a wavelength range of 700–800 nm.

Further, when a wavelength of a laser beam emitted from a semiconductor laser light source of an optical pickup apparatus is at least one wavelength within a range of 400–450 nm, it is preferable that thickness of antireflection coating 3 is established so that the reflectance for the light entering, at angle 0°, antireflection coating 3 on peripheral portion P1 where the angle θ is not less than 45° may show the minimum value within a wavelength range of 420–520 nm.

It is preferable that thickness of antireflection coating 4 is established so that reflectance of light entering, at angle 0°, antireflection coating 3 on center portion C1 where the angle θ is 0° may show the minimum value within a wavelength range of 380–490 nm.

It is preferable that thickness of antireflection coating 4 is established so that reflectance for light entering, at angle 0°, antireflection coating 4 on center portion C2 where the angle θ is 0° may show the minimum value within a wavelength range of 400–490 nm.

In particular, when a wavelength of a laser beam emitted from a semiconductor laser light source of an optical pickup apparatus is at least one wavelength within a range of 400–420 nm, it is preferable that thickness of antireflection coating 3 is established so that the reflectance for the light entering, at angle 0°, antireflection coating 3 on peripheral portion P1 where the angle θ is not less than 45° may show the minimum value within a wavelength range of 420–490 nm.

It is preferable that thickness of antireflection coating 3 is established so that reflectance of light entering, at angle 0°, antireflection coating 3 on center portion C1 where the angle θ is 0° may show the minimum value within a wavelength range of 380–440 nm.

It is preferable that thickness of antireflection coating 4 is established so that reflectance for light entering, at angle 0°, antireflection coating 4 on center portion C2 where the angle θ is 0° may show the minimum value within a wavelength range of 400–490 nm.

It is preferable that thickness of antireflection coating 3 is established so that reflectance for light entering, at angle 0°, antireflection coating 3 on peripheral portion P1 where the angle θ is not less than 50° may show the minimum value within a wavelength range of 430–490 nm.

It is preferable that thickness of antireflection coating 3 on peripheral portion P1 is (1–1.5) times that of antireflection coating 3 on center portion C1, and it is more preferable that thickness of antireflection coating 3 on peripheral portion P1 is (1–1.2) times that of antireflection coating 3 on center portion C1.

Further, it is preferable that thickness of antireflection coating 4 on peripheral portion P2 is (1–1.5) times that of antireflection coating 4 on center portion C2, and it is more preferable that thickness of antireflection coating 4 on peripheral portion P2 is (1–1.2) times that of antireflection coating 4 on center portion C2.

Antireflection coatings 3 and 4 each having the aforementioned structure are coated through a coating method which has been known widely, such as, for example, a vacuum deposition method or a sputtering method. As an example, coating of the antireflection coating by means of the vacuum deposition method will be explained as follows.

For the vacuum deposition of the antireflection coating, there is used, for example, vacuum deposition apparatus 5 shown in FIG. 4(a). Inside vacuum tank 50 of the vacuum deposition apparatus 5, there are provided base board rotating apparatus 6, electron gun evaporation source 51 for evaporating a material of an antireflection coating and air exit 52 that exhausts air from the vacuum tank 50. The base board rotating apparatus 6 is composed of lens holding base board 61 that holds lens 1, ring-shaped base board holding ring 62 that is fixed and supported, and ring-shaped base board rotating and holding ring 63 that is supported rotatably.

The lens holding base board 61 is almost disk-shaped, and it is structured to be capable of holding a plurality of lenses 1. As is shown in FIG. 4(b), the lens holding base board 61 is arranged to hold lens 1 so that lens surface S of the lens 1 may appear on the same side of the lens holding base board 61.

As is shown in FIG. 4(a), the base board holding ring 62 and the base board rotating and holding ring 63 are respectively supported horizontally so that a circular center of each of them may be positioned on the same axis approximately. In addition, the base board rotating and holding ring 63 is arranged to be lower than the base board holding ring 62. As is shown in FIG. 4(b), there is provided protruded portion 64 that is protruded upward on the circumference of the base board rotating and holding ring 63.

A top end of the lens holding base board 61 is supported upward by the circumference of the base board holding ring 62, and a bottom end of the lens holding base board 61 is supported by the protruded portion 64 of the base board rotating and holding ring 63. Due to this, the lens holding base board 61 is supported at holding angle H by the base board holding ring 62 and the base board rotating and holding ring 63.

A supporting position for the base board holding ring 62 and that for the base board rotating and holding ring 63 can be changed appropriately for setting so that the holding angle H may be adjusted properly.

In the base board rotating apparatus 6 having the aforesaid structure, when the base board rotating and holding ring 63 is rotated in the direction of arrow Y1 shown in FIG. 4(a), the lens holding base board 61 moves in the direction of arrow Y3 on the base board rotating and holding ring 63, while rotating in the direction of arrow Y2. Owing to this, lens 1 held by the lens holding base board 61 can be rotated by 360° while the lens 1 keeps its state wherein an optical axis of the lens 1 is inclined by holding angle H.

When forming an antireflection coating on lens 1 by the use of vacuum deposition apparatus 5 having the structure stated above, vacuum tank 50 is made vacuous by exhausting air from the vacuum tank 50 through air exit 52, and supporting positions respectively for the base board holding ring 62 and the base board rotating and holding ring 63 are established so that desired holding angle H may be obtained, in advance.

In the course of vacuum deposition, a material for an antireflection coating is evaporated from electron gun evaporation source 51 (arrow Y4 in FIG. 4(a)), while the base board rotating apparatus 6 is driven to rotate, so that the antireflection coating may be formed on lens surface S of lens 1 held by the lens holding base board 61. Owing to this, it is possible to form an antireflection coating so that thickness of the antireflection coating on the peripheral portion of the lens surface S may be the same as or greater than thickness of the antireflection coating on the center portion of the lens surface S, in accordance with holding angle H.

Incidentally, without being limited to the vacuum deposition method employing the vacuum deposition apparatus 5 stated above, any coating method can be applied, provided that the method is one capable of forming antireflection coatings 3 and 4 having the aforesaid structure.

In the lens 1 of the present embodiment, thickness of antireflection coating 3 on peripheral portion P1 is greater than that of antireflection coating 3 on center portion C1, and thickness of antireflection coating 4 on peripheral portion P2 is greater than that of antireflection coating 4 on center portion C2 as stated above.

Due to this, compared with a conventional objective lens wherein thickness of an antireflection coating on a peripheral portion of a lens has been thinner than that of an antireflection coating on a center portion, it is possible to lower an extent for wavelength-dependency of the reflectance for light entering each of peripheral portions P1 and P2 respectively of lens surfaces S1 and S2 obliquely to shift to the shorter wavelength side more than for wavelength-dependency of the reflectance for light entering each of center portions C1 and C2 vertically, when a collimated light enters the lens surface S1.

Therefore, it is possible to lower the degree of rise of reflectance for light on peripheral portions P1 and P2, while establishing thickness of each of antireflection coatings 3 and 4 respectively on center portions C1 and C2 so that reflectance for light on the center portions C1 and C2 may become low, which is different from the conventional objective lens. Accordingly, a decline of an amount of light passing through peripheral portions P1 and P2 can be controlled, and compared with the past, light-converging power is improved more, a spot diameter of a laser beam can be made small and an amount of light passing through the lens can be secured.

Further, on peripheral portion P1 on lens surface S1 where a curvature is great, there is included a surface where angle θ is 45°, and thickness of antireflection coating 3 is not smaller than that of antireflection coating 3 on center portion C where angle θ is 0°. Therefore, in a high-NA optical lens having a lens surface where angle θ is relatively large, light-converging power can improved and thereby, it is possible to contribute to realization of an optical recording medium having great capacity.

When thickness of antireflection coating 3 is established so that a wavelength wherein reflectance for light entering, at an angle 0°, the antireflection coating 3 on peripheral portion P1 may not be smaller than that of a wavelength wherein reflectance for light entering, at an angle 0°, the antireflection coating 3 on center portion C1, it is possible to control a degree for dependency of reflectance of light on peripheral portion P1 to shift to the short wavelength side to be low more firmly.

In the same way, when thickness of antireflection coating 4 is established so that a wavelength wherein reflectance for light entering, at an angle 0°, the antireflection coating 4 on peripheral portion P2 may not be smaller than that of a wavelength wherein reflectance for light entering, at an angle 0°, the antireflection coating 4 on center portion C2, it is possible to control a degree for dependency of reflectance of light on peripheral portion P2 to shift to the short wavelength side to be low more firmly.

Accordingly, a decline of an amount of light passing through peripheral portions P1 and P2 of lens 1 can be surely controlled, a spot diameter can be made small and an amount of light passing through the lens can be surely secured.

When thickness of antireflection coating 3 is established so that a wavelength wherein reflectance for light entering, at an angle 0°, the antireflection coating 3 on at least a part of peripheral portion P1 may be the same as that of a wavelength wherein reflectance for light entering, at an angle 0°, the antireflection coating 3 on center portion C1, wavelength-dependency of reflectance for light on the peripheral portion P1 is mostly the same as that of reflectance for light on the center portion C1.

Therefore, reflectance for,light on peripheral portion P1 can be controlled to be of the level similar to that of reflectance for light on center portion C1, and thereby, an amount of light passing through peripheral portion P1 can be made large to the level similar to that of an amount of light passing through center portion C1, thus, an amount of light passing through the total lens 1 can be increased remarkably.

Further, when a wavelength of a laser beam of an optical pickup apparatus is at least one wavelength within a range of the aforementioned prescribed wavelengths, if thickness of antireflection coating 3 is established so that the reflectance for the light entering, at angle 0°, antireflection coating 3 on peripheral portion P1 where the angle θ is not less than 45° may show the minimum value within a range of the respective wavelength an amount of light that is emitted from the laser light source and passes through peripheral portion P1 can be made more large.

When thickness of antireflection coating 3 is established so that reflectance for light entering, at an angle 0°, each of antireflection coatings 3 and 4 respectively on center portions C1 and C2 where angle θ is 0° may show the minimum value in each of the prescribed wavelength ranges stated above, a relatively large amount can be secured for the light that is emitted from the laser light source and passes through each of center portions C1 and C2.

When thickness of antireflection coating 3 is established so that reflectance for light entering, at an angle 0°, antireflection coating 3 on peripheral portions P1 where angle θ is 50° or more may show the minimum value in each of the prescribed wavelength ranges stated above, it is possible to secure more amount of light that is emitted from the laser light source and passes through peripheral portion P1 where angle θ is 50° or more. Therefore, in the optical lens with high NA having a lens surface on which angle θ is extremely large, light-converging power can be improved, and thereby, it is possible to contribute greatly to realization of a large capacity of an optical recording medium.

When thickness of antireflection coating 3 on peripheral portions P1 is (1–1.5) times (more preferably, (1–1.2) times) that of antireflection coating 3 on center portions C1, or when thickness of antireflection coating 4 on peripheral portions P2 is (1–1.5) times (more preferably, (1–1.2) times) that of antireflection coating 4 on center portions C2, a change of a lens form caused by each of antireflection coatings 3 and 4 can be controlled to be less.

Further, in an optical pickup apparatus equipped with lens 1, light emitted from a semiconductor laser light source is converged by the lens 1 on an optical recording medium, and thereby, a spot diameter of a laser beam can be made small and more amount of light passing through the lens 1 can be secured.

Accordingly, compared with the past, information can be recorded on an optical recording medium on a higher density basis, and information can be reproduced from an optical recording medium on which information is recorded on high density basis, thus, a large capacity of an optical recording medium can be realized.

Incidentally, each of antireflection coatings 3 and 4 is structured to have a first layer and a second layer, in the present embodiment. However, an antireflection coating has only to have power as an antireflection coating by keeping reflectance for light to be low, and the invention is not limited to the aforementioned structure in particular.

There have been explained an example (FIG. 1($a$)) wherein thickness of each of antireflection coatings 3 and 4 provided respectively on lens surfaces S1 and S2 is mostly uniform, and an example (FIG. 1($b$)) wherein each of antireflection coatings 3 and 4 is formed so that its thickness becomes greater gradually as a position corresponding to that thickness moves from each of center portions C1 and C2 to each of peripheral portions P1 and P2. However, the invention is not limited to these structures.

For example, the invention can employ the structure wherein antireflection coating 3 to be provided on lens surface S1 is formed to be mostly uniform in terms of thickness, and antireflection coating 4 to be provided on lens surface S2 is formed so that its thickness becomes greater as a position corresponding to that thickness moves from center portion C2 to peripheral portion P2.

Since a curvature on the lens surface S2 is smaller than that on the lens surface S1, even in the case of the structure wherein thickness of antireflection coating 4 on peripheral portion P2 of the lens surface S2 is smaller than that of antireflection coating 4 on center portion C2, an amount of light passing through peripheral portion P2 is not lowered relatively, and an amount of light to a certain extent can be secured.

FIG. 1($b$) shows the structure wherein thickness of antireflection coating 3 becomes greater as a position corresponding to that thickness moves from center portion C1 to peripheral portion P1. However, thickness of the antireflection coating 3 is not always necessary to become greater gradually as a position corresponding to that thickness moves toward peripheral portion P1, and thickness of antireflection coating 3 on peripheral portion P1 has only to be formed to be greater than that of antireflection coating 3 on center portion C1. This also applies to the antireflection coating 4.

Though the surface where angle θ is 45° or more is included in peripheral portion P1 on lens surface S1 in the above explanation, it is also possible to employ the structure wherein the surface where angle θ is 45° or more is included in peripheral portion P1. Even in the case where the structure of the invention is applied to a lens having a relatively low numerical aperture, a spot diameter can be made small, and an amount of light passing through the lens can be secured.

Though the optical pickup apparatus equipped with lens 1 is one capable of conducting recording and reproducing of information, the lens of the invention can naturally be applied, without being limited to the foregoing, to an optical pickup apparatus capable of conducting either one of recording and reproducing of information.

EXAMPLE

The invention will be explained concretely as follows, referring to the Sample to which, however, the invention is not limited.

Reflectance Characteristics of Antireflection Coating

Reflectance characteristics of an antireflection coating that has a layer structure shown in Table 1 and Table 2 below and is provided on a base material were investigated. Zeonex resin was used as the base material in this case.

Reflectance for light entering (entering a lens from the air) at an angle 0° was measured by the use of a lens reflectance measuring instrument (USPM-RU-II) made by Olympus Optical Co., Ltd., regarding each antireflection coating having each of layer structures from 1-1 to 1-13 shown in Table 1 and layer structures from 2-1 to 2-11 shown in Table 2. Reflectance for light entering at an angle 45° and reflectance for light entering at an angle 50° were calculated by calculation. Results of them are shown in Table 1 and Table 2.

TABLE 1

| | | | | 1-1 | 1-2 | 1-3 | 1-4 | 1-5 | 1-6 | 1-7 |
|---|---|---|---|---|---|---|---|---|---|---|
| Base material | Zeonex resin | | | | | | | | | |
| First layer | Cerium oxide | Thickness | nm | 30.3 | 31.4 | 33 | 34 | 34.6 | 35.7 | 36.5 |
| Second layer | Silicon oxide | Thickness | nm | 121.9 | 126.3 | 133 | 137.4 | 139.6 | 144 | 147.3 |
| Wavelength wherein reflectance shows minimum value for vertical entering | | | nm | 560 | 580 | 610 | 630 | 640 | 660 | 675 |
| Reflectance for wavelengths 630–680 nm | | For 0° entering | % | 1.0–2.2 | 0.6–1.8 | 0.3–0.8 | 0.2–0.5 | 0.2–0.4 | 0.1–0.3 | 0.2–0.4 |
| | | For 45° entering | % | 3.3–4.2 | 2.7–3.8 | 2–3.1 | 1.6–2.6 | 1.4–2.4 | 1.1–2 | 0.9–1.7 |
| | | For 50° entering | % | 4.5–5.3 | 3.7–4.8 | 3–41 | 2.5–3.6 | 2.2–3.4 | 1.8–2.9 | 1.6–2.6 |
| Reflectance for wavelengths 630–650 nm | | For 0° entering | % | 0.9–2 | 0.6–1.5 | 0.3–0.4 | 0.2–0.3 | 0.2–0.3 | 0.2–0.3 | 0.2–0.4 |
| | | For 45° entering | % | 3.2–3.7 | 2.8–3.2 | 2–2.5 | 1.5–2 | 1.4–1.8 | 1.4–1.8 | 0.9–1.2 |
| | | For 50° entering | % | 4.5–4.7 | 3.7–4.2 | 3–3.4 | 2.5–2.9 | 2.2–2.7 | 1.8–2.2 | 1.6–1.9 |
| Reflectance for wavelengths 650–670 nm | | For 0° entering | % | 1.2–1.6 | 0.9–1.2 | 0.4–0.7 | 0.3–0.4 | 0.2–0.3 | 0.1–0.2 | 0.1–0.2 |
| | | For 45° entering | % | 3.7–4.1 | 3.2–3.6 | 2.5–2.9 | 2–2.4 | 1.8–2.2 | 1.5–1.9 | 1.2–1.5 |
| | | For 50° entering | % | 4.7–5.1 | 4.2–4.6 | 3.4–3.8 | 2.9–3.4 | 2.7–3.1 | 2.2–2.7 | 2–2.3 |

| | | | | 1-8 | 1-9 | 1-10 | 1-11 | 1-12 | 1-13 |
|---|---|---|---|---|---|---|---|---|---|
| Base material | Zeonex resin | | | | | | | | |
| First layer | Cerium oxide | Thickness | nm | 37.3 | 38.4 | 40.1 | 41.4 | 42 | 44.4 |
| Second layer | Silicon oxide | Thickness | nm | 150.6 | 155.1 | 161.7 | 167.2 | 169.4 | 179.3 |
| Wavelength wherein reflectance shows minimum value for vertical entering | | | nm | 690 | 700 | 740 | 760 | 775 | 820 |
| Reflectance for wavelengths 630–680 nm | | For 0° entering | % | 0.2–0.8 | 0.3–1.2 | 0.6–2 | 1.1–3 | 1.3–3.4 | 2.8–5.5 |
| | | For 45° entering | % | 0.8–1.4 | 0.7–1.1 | 0.6–0.8 | 0.6–1 | 0.6–1.1 | 0.9–2.2 |
| | | For 50° entering | % | 1.4–2.3 | 1.2–1.9 | 1.0–1.7 | 1.0–1.2 | 1–1.3 | 1.1–1.2 |
| Reflectance for wavelengths 630–650 nm | | For 0° entering | % | 0.4–0.8 | 0.6–1.2 | 1.3–2 | 2.1–3 | 2.4–3.4 | 4.3–5.5 |
| | | For 45° entering | % | 0.8–0.9 | 0.7–0.8 | 0.6–0.7 | 0.7–1 | 0.8–1.1 | 1.6–2.2 |
| | | For 50° entering | % | 1.4–1.7 | 1.2–1.4 | 1–1.1 | 1–1.2 | 1.1–1.3 | 1.6–2.2 |
| Reflectance for wavelengths 650–670 nm | | For 0° entering | % | 0.2–0.4 | 0.3–0.6 | 0.8–1.3 | 1.4–2.1 | 1.7–2.4 | 3.2–4.3 |
| | | For 45° entering | % | 0.9–1.3 | 0.8–1.0 | 0.6–0.8 | 0.6–0.7 | 0.6–0.8 | 1.1–1.6 |
| | | For 50° entering | % | 1.7–2.1 | 1.4–1.7 | 1–1.7 | 1–1.1 | 1–1.1 | 1.3–1.6 |

TABLE 2

| | | | | 2-1 | 2-2 | 2-3 | 2-4 | 2-5 | 2-6 | 2-7 | 2-8 | 2-9 | 2-10 | 2-11 |
|---|---|---|---|---|---|---|---|---|---|---|---|---|---|---|
| Base material | Zeonex resin | | | | | | | | | | | | | |
| First layer | Cerium oxide | Thickness | nm | 15.5 | 16.8 | 17.7 | 18.1 | 18.6 | 19 | 19.5 | 20.8 | 21.7 | 23 | 24.3 |
| Second layer | Silicon oxide | Thickness | nm | 77.7 | 84.6 | 89.2 | 91.5 | 93.8 | 96.1 | 98.4 | 105.3 | 110 | 116.7 | 123.6 |
| Wavelength wherein reflectance shows minimum value for vertical entering | | | nm | 350 | 380 | 400 | 410 | 420 | 430 | 440 | 470 | 500 | 525 | 550 |

TABLE 2-continued

|  |  |  | 2-1 | 2-2 | 2-3 | 2-4 | 2-5 | 2-6 | 2-7 | 2-8 | 2-9 | 2-10 | 2-11 |
|---|---|---|---|---|---|---|---|---|---|---|---|---|---|
| Reflectance for wavelengths 400–450 nm | For 0° entering | % | 1.1–2.7 | 0.3–1.5 | 0.1–0.8 | 0.1–0.6 | 0.1–0.4 | 0.1–0.6 | 0.1–0.9 | 0.3–2.6 | 0.7–4.2 | 2.2–6.9 | 4.1–9.7 |
|  | For 45° entering | % | 3.7–5.3 | 2.3–4.1 | 1.5–3.3 | 1.2–3 | 0.9–2 | 0.7–1.9 | 0.6–1.8 | 0.7–0.9 | 0.6–1.3 | 0.6–2.8 | 1.3–5 |
|  | For 50° entering | % | 4.7–6.4 | 3.3–5.2 | 2.4–4.3 | 2.0–4 | 1.6–3.5 | 1.4–3.1 | 1.1–2.7 | 1–1.7 | 1.0–1.4 | 1–2.7 | 1.3–4.7 |
| Reflectance for wavelengths 400–420 nm | For 0° entering | % | 1.1–2.1 | 0.3–1 | 0.1–0.5 | 0.1–0.2 | 0.1–0.3 | 0.1–0.6 | 0.3–0.9 | 1.3–2.6 | 2.4–4.2 | 4.6–6.9 | 7.2–9.7 |
|  | For 45° entering | % | 3.7–4.4 | 2.3–3.0 | 1.5–2.2 | 1.2–2 | 0.9–1.5 | 0.7–1.2 | 0.6–1 | 0.7–0.8 | 0.7–1.3 | 1.5–2.8 | 3.1–5 |
|  | For 50° entering | % | 4.7–5.5 | 3.3–4.1 | 2.4–3.2 | 2–2.8 | 1.6–2.4 | 1.4–1.9 | 1.1–1.7 | 1.0–1.1 | 1.0–1.4 | 1.5–2.7 | 2.8–4.7 |

In each of Table 1 and Table 2 in this case, there is shown a wavelength wherein reflectance for light entering vertically (angle 0°) shows the minimum value.

In Table 1, there are shown reflectance (maximum value–minimum value) for light within each of wavelength ranges 630–680 nm, 630–650 nm and 650–670 nm. In Table 2, there are shown reflectance (maximum value–minimum value) for light within each of wavelength ranges 400–450 nm and 400–420 nm.

From the results shown in Table 1 and Table 2, it is possible to learn the layer structure that can be applied preferably to antireflection coatings 3 and 4 on lens 1. For identifying the preferable layer structure, it was checked that whether or not the low reflectance of 2% or less was obtained under each condition. The basis for the foregoing is that the criterion of light transmittance for the lens having a sufficient amount of emergent light is about 96% generally, and this is attained when each of an incident lens surface and an emergent lens surface of the lens has reflectance of about 2% or less. The layer structure which is extremely preferable can be identified when low reflectance of about 1% or less is obtained under each condition.

However, it is difficult to manufacture so that thickness difference of antireflection coating 4 between center portion C2 and peripheral portion P2 may be great, because the curvature of lens surface S2 is smaller than that of lens surface S1. Therefore, for specifying the preferable layer structure on the lens surface S2, it was taken into consideration that whether the low reflectance can also be obtained or not even on peripheral portion P2 (especially, the portion where angle θ is 45°) for the same thickness which offers a low reflectance of about 2% or less on center portion C2.

Further, the reflectance on a position where angle θ was 45° was referred to, on each of peripheral portions P1 and P2 where angle θ was 45° or more, and the reflectance on a position where angle θ was 50° was referred to, on each of peripheral portions P1 and P2 where angle θ was 50° or more.

In addition, let is be assumed that angles each being formed by a normal line and an incident light or by a normal line and an emergent light on each of lens surfaces S1 and S2 are collectively represented by angle α. The angle α corresponds, for example, to light incident angles α1, α11 and α12 and light emergent angles α2, α21 and α22 in FIGS. 2 and 3. On each of the lens surfaces S1, S11 and S12, angle θ is almost the same as angle α, when a ray of light which is almost in parallel with optical axis L enters the lens surface.

Namely, Table 1 shows that, when a wavelength of a laser beam emitted from the semiconductor laser light source of the optical pickup apparatus is within a range of 630–680 nm, it is preferable to apply the layer structure wherein the reflectance for light entering vertically shows the minimum value within a wavelength range of 630–800 nm, as a layer structure of antireflection coating 3 on peripheral portion P1 where angle θ is 45° or more. Due to this, it is possible to obtain an excellent low reflectance of about 2% or less for light having at least one of wavelengths 630–680 nm on peripheral portion P1. In addition, if the layer structure of antireflection coating 3 wherein the reflectance for the aforesaid light shows the minimum value within a wavelength range of 660–775 nm is applied, the reflectance which is further lower can be obtained, which is extremely preferable.

Further, it is understandable that, it is preferable to apply the layer structure wherein the reflectance for light entering vertically shows the minimum value within a wavelength range of 580–740 nm, as a layer structure of antireflection coating 3 on center portion C1 where angle θ is 0°. Due to this, it is possible to obtain an excellent low reflectance of about 2% or less for light having each of all wavelengths 630–680 nm on center portion C1. In addition, if the layer structure of antireflection coating 3 wherein the reflectance for the aforesaid light shows the minimum value within a wavelength range of 610–690 nm is applied, the low reflectance of about 1% or less for all wavelengths can be obtained, which is extremely preferable.

Further, it is understandable that, it is preferable to apply the layer structure wherein the reflectance for light entering vertically shows the minimum value within a wavelength range of 630–800 nm, as a layer structure of antireflection coating 4 on center portion C2 where angle θ is 0°. Due to this, it is possible to obtain an excellent low reflectance of about 2% or less for light having at least one of wavelengths 630–680 nm on center portion C2. In addition, if the layer structure of antireflection coating 4 wherein the reflectance for the aforesaid light shows the minimum value within a wavelength range of 640–740 nm is applied, the low reflectance of about 2% or less for light having each of all wavelengths 630–680 nm can be obtained, which is more preferable.

Even in the case wherein peripheral portion P2 has a curved surface having a high curvature where incident angle α for light is 45° or more although angle θ is as small as 10° or less, it is possible to obtain an excellent low reflectance wherein reflectance for incident light is about 2% or less on peripheral portion P2, by applying, as a layer structure for peripheral portion P2, the same layer structure as in the aforesaid center portion C2.

In particular, when a wavelength of a laser beam emitted from the semiconductor laser light source is within a range of 630–650 nm, if the layer structure wherein reflectance for light entering vertically shows the minimum value within a wavelength range of 640–770 nm is applied as a layer structure of antireflection coating 3 on peripheral portion P1 where angle θ is 45° or more, if the layer structure wherein reflectance for light entering vertically shows the minimum value within a wavelength range of 600–700 nm is applied as a layer structure of antireflection coating 3 on center portion C1 where angle θ is 0°, and if the layer structure wherein reflectance for light entering vertically shows the minimum value within a wavelength range of 640–740 nm is applied as a layer structure of antireflection coating 4 on center portion C2 where angle θ is 0°, a low and excellent reflectance of about 2% or less for light having each of all wavelengths of 630–650 nm can be obtained, which is preferable.

Further, it is understandable that it is preferable to apply the layer structure wherein reflectance for light entering vertically shows the minimum value within a wavelength range of 670–770 nm as a layer structure of antireflection coating 3 on peripheral portion P1 where angle θ is 50° or more. Due to this, an excellent and low reflectance of about 2% or less for light having each of all wavelengths 630–650 nm can be obtained on peripheral portion P1 where angle θ is 50° or more.

Further, when a wavelength of a laser beam emitted from the semiconductor laser light source is within a range of 650–670 nm, if the layer structure wherein reflectance for light entering vertically shows the minimum value within a wavelength range of 660–800 nm is applied as a layer structure of antireflection coating 3 on peripheral portion P1 where angle θ is 45° or more, a low and excellent reflectance of about 2% or less for light having each of all wavelengths of 650–670 nm can be obtained, which is preferable. If the layer structure is one wherein the reflectance shows the minimum value within a wavelength range of 700–770 nm, the reflectance is 1% or less, which is extremely preferable.

Further, if the layer structure wherein reflectance for light entering vertically shows the minimum value within a wavelength range of 610–740 nm is applied as a layer structure of antireflection coating 3 on center portion C1 where angle θ is 0°, a low and excellent reflectance of about 2% or less for light having each of all wavelengths of 650–670 nm can be obtained, which is preferable. If the layer structure is one wherein the reflectance shows the minimum value within a wavelength range of 700–770 nm, the reflectance is 1% or less, which is extremely preferable.

Further, if the layer structure wherein reflectance for light entering vertically shows the minimum value within a wavelength range of 660–740 nm is applied as a layer structure of antireflection coating 4 on center portion C2 where angle θ is 0°, a low and excellent reflectance of about 2% or less for light having each of all wavelengths of 650–670 nm can be obtained, which is preferable, and even in the case wherein angle θ is as small as 10° or less on peripheral portion P2, a preferable reflectance can be obtained with the same layer structure, if there is a curved surface where angle α is 45° or more.

Further, if the layer structure wherein reflectance for light entering vertically shows the minimum value within a wavelength range of 700–800 nm is applied as a layer structure of antireflection coating 3 on peripheral portion P1 where angle θ is 50° or more, a low and excellent reflectance of about 2% or less for light having each of all wavelengths of 650–670 nm can be obtained, which is preferable. Due to this, an excellent and low reflectance of about 2% or less can be obtained on peripheral portion P1 where angle θ is 50° or more.

Further, Table 2 shows that, when a wavelength of a laser beam emitted from the semiconductor laser light source of the optical pickup apparatus is within a range of 400–450 nm, it is preferable to apply the layer structure wherein the reflectance for light entering vertically shows the minimum value within a wavelength range of 420–520 nm, as a layer structure of antireflection coating 3 on peripheral portion P1 where angle θ is 45° or more. Due to this, it is possible to obtain an excellent and low reflectance of about 2% or less for light having each of all wavelengths 400–450 nm on peripheral portion P1.

Further, it is understandable that, it is preferable to apply the layer structure wherein the reflectance for light entering vertically shows the minimum value within a wavelength range of 380–490 nm, as a layer structure of antireflection coating 3 on center portion C1 where angle θ is 0°. Due to this, it is possible to obtain an excellent and low reflectance of about 2% or less for light having at least one of wavelengths 400–450 nm on center portion C1.

Further, it is understandable that, it is preferable to apply the layer structure wherein the reflectance for light entering vertically shows the minimum value within a wavelength range of 400–490 nm, as a layer structure of antireflection coating 4 on center portion C2 where angle θ is 0°. Due to this, it is possible to obtain an excellent and low reflectance of about 2% or less for light having at least one of wavelengths 400–450 nm on center portion C2. Further, even when angle θ is as small as 10° or less on peripheral portion P2, a preferable reflectance can be obtained with the same layer structure, if there is a curved surface where angle α is 45° or more.

In particular, when a wavelength of a laser beam emitted from the semiconductor laser light source is within a range of 400–420 nm, if the layer structure wherein reflectance for light entering vertically shows the minimum value within a wavelength range of 420–490 nm is applied as a layer structure of antireflection coating 3 on peripheral portion P1 where angle θ is 45° or more, if the layer structure wherein reflectance for light entering vertically shows the minimum value within a wavelength range of 380–440 nm is applied as a layer structure of antireflection coating 3 on center portion C1 where angle θ is 0°, and if the layer structure wherein reflectance for light entering vertically shows the minimum value within a wavelength range of 400–490 nm is applied as a layer structure of antireflection coating 4 on center portion C2 where angle θ is 0°, an excellent and low reflectance of about 2% or less for light having each of all wavelengths of 400–420 nm can be obtained, which is preferable.

Further, it is understandable that it is preferable to apply the layer structure wherein reflectance for light entering vertically shows the minimum value within a wavelength range of 430–490 nm as a layer structure of antireflection coating 3 on peripheral portion P1 where angle θ is 50° or more. Due to this, an excellent and low reflectance of about 2% or less for light having each of all wavelengths 400–420 nm can be obtained on peripheral portion P1 where angle θ is 50° or more.

In the aforementioned structures, when the minimum value of reflection for light entering each of peripheral portions P1 and P2 is brought to the wavelength of a laser beam so that it may function, the minimum value needs to be the same as or more than the wavelength of the laser beam, because the minimum value of reflectance for light entering each of peripheral portions P1 and P2 is shifted more to the short wavelength side than the minimum value of reflectance for light entering each of center portions C1 and C2 is shifted. Therefore, it is more preferable if the minimum value of reflectance for light entering each of peripheral portions P1 and P2 is made to be the same as or more than the wavelength of the laser light source, and it is possible to obtain low reflectance which is more excellent for light having a wavelength in a range of each condition stated above.

Lens Evaluation

Lens 1 was made (Inventive samples 1–5, Comparative sample) through a vacuum deposition method by the use of vacuum deposition apparatus 5 stated above, by forming each of antireflection coatings 3 and 4 in the layer structures (numbers of layer structures shown in columns correspond to those in above-mentioned Table 1 and Table 2) shown in Table 3 below on each of lens surfaces S1 and S2 of base material 2 (Zeonex resin) processed to be in a lens form.

In the vacuum deposition on lens surface S1 in this case, antireflection coating 3 having the layer structure shown in Table 3 was formed, by adjusting holding angle H properly. In the vacuum deposition on lens surface S2, antireflection coating 4 having the layer structure shown in Table 3 was formed, by adjusting holding angle H to about 20–40° properly.

Inventive Sample 4, wavelength-dependency (207S) of reflectance for light entering at angle 45° and wavelength-dependency (204V) of reflectance for light entering at angle 0° for an antireflection coating having layer structure-4.

Figure 5:
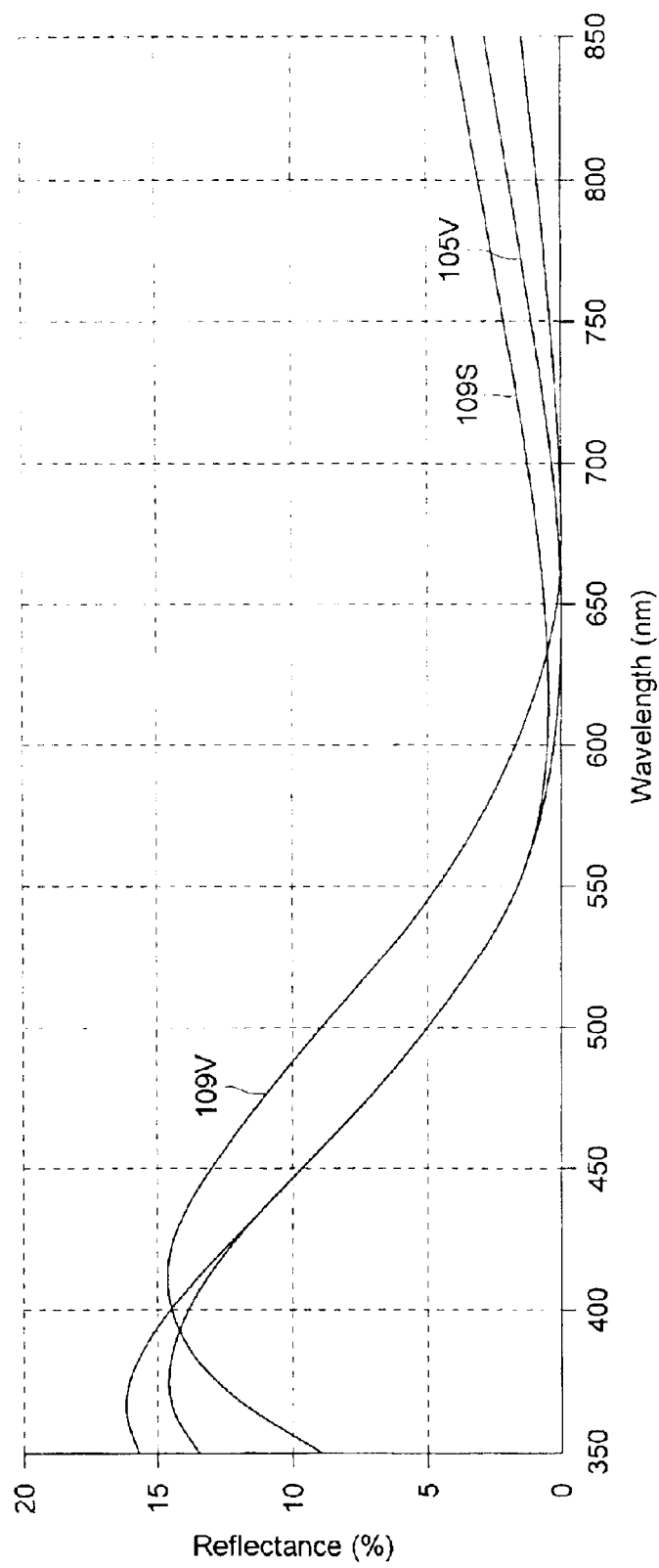
FIG. 5 is a graph showing wavelength-dependency of the reflectance for light on an antireflection coating applied on the lens in Inventive Sample 1.
Figure 6:
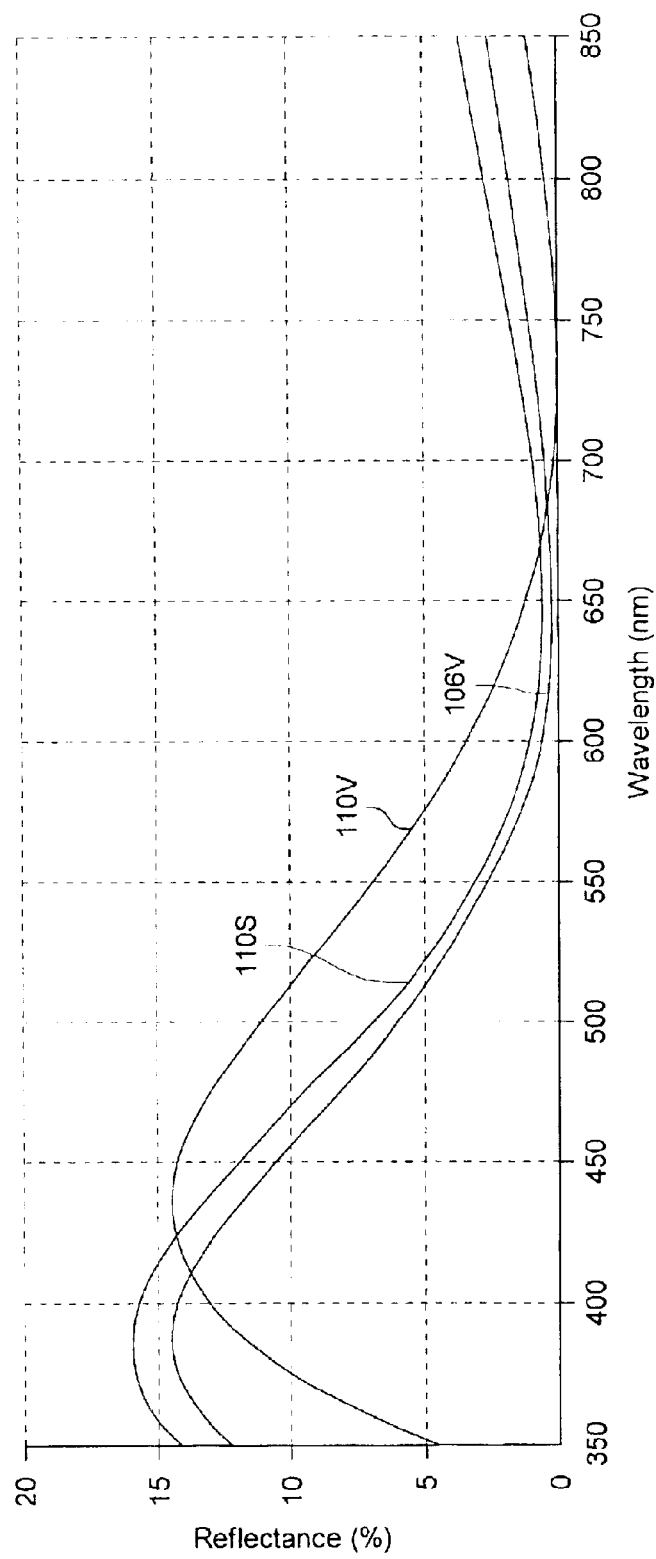
FIG. 6 is a graph showing wavelength-dependency of the reflectance for light on an antireflection coating applied on the lens in Inventive Sample 2.
Figure 7:
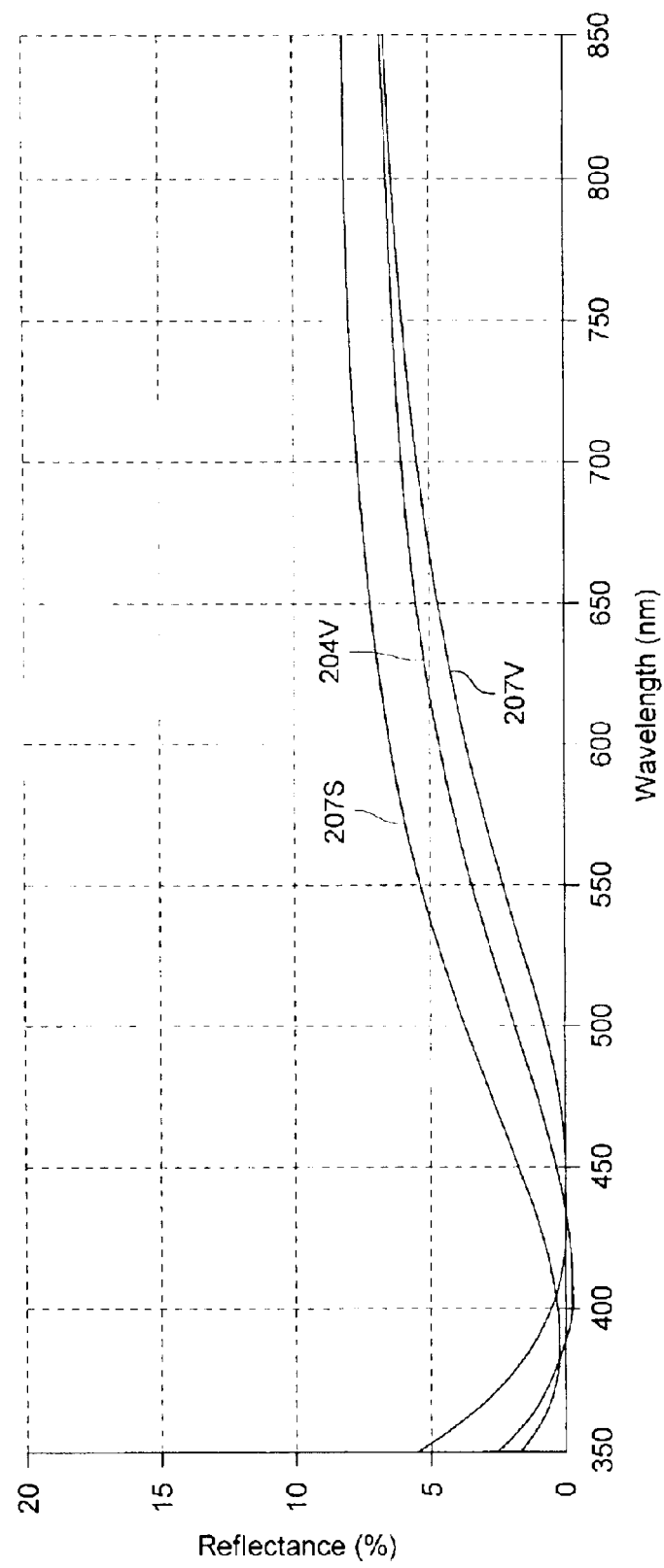
FIG. 7 is a graph showing wavelength-dependency of the reflectance for light on an antireflection coating applied on the lens in Inventive Sample 4.
Figure 8:
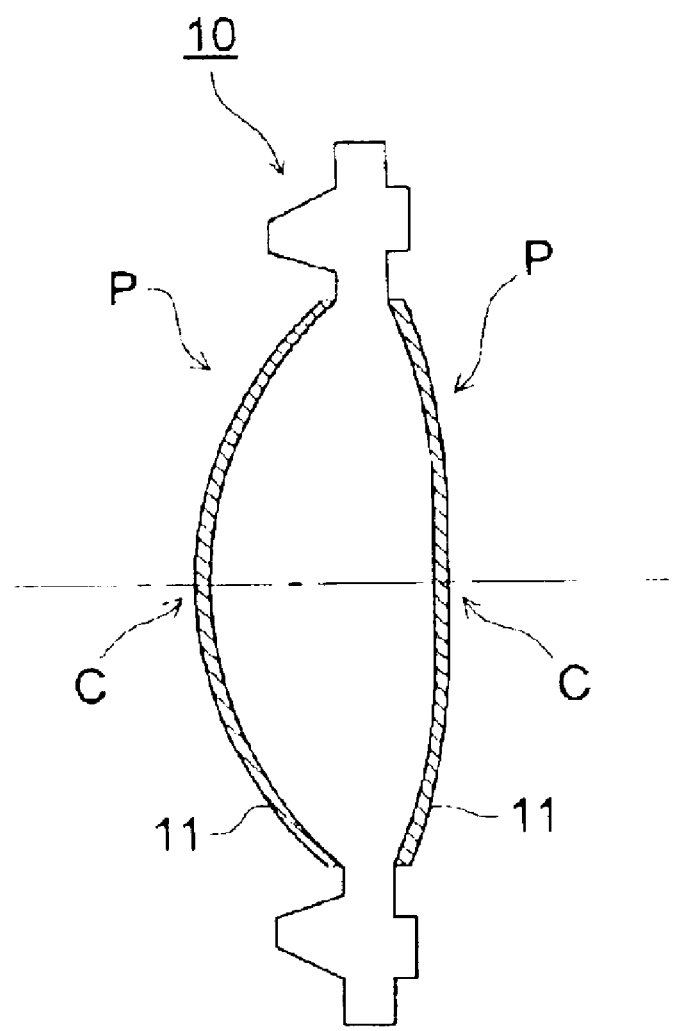
FIG. 8 is a schematic longitudinal section showing a conventional objective lens.

FIGS. 5–7 indicate that an antireflection coating having respective layer structure is the so-called V coating which shows the minimum reflectance within a prescribed wavelength range. Further, it is understood that wavelength-dependency of reflectance for light entering at angle 45° (for example, 109S shown in FIG. 5) is more shifted to the short wavelength side than wavelength-dependency (109V) of light entering at angle 0° is shifted. With respect to the wavelength-dependency of reflectance for light entering at angle 0°, it is understood that the thicker the antireflection coating is, the more the wavelength-dependency is shifted to

TABLE 3

|  |  | Inventive Sample 1 | Inventive Sample 2 | Inventive Sample 3 | Inventive Sample 4 | Inventive Sample 5 | Comparative Sample |
|---|---|---|---|---|---|---|---|
| Wavelength of laser beam (nm) | | 635 | 660 | 660 | 410 | 410 | 660 |
| S1 surface | Lens center portion | 1–5 | 1–6 | 1–6 | 2–4 | 2–9 | 1–13 |
| | Lens peripheral portion | 1–9 | 1–10 | 1–11 | 2–7 | 2–10 | 1–1 |
| S2 surface | Lens center portion | 1–8 | 1–9 | 1–9 | 2–6 | 2–2 | 1–6 |

In the column of "Wavelength of laser beam" in Table 3 above, there is shown a wavelength of a laser beam emitted from a semiconductor laser light source of an optical pickup apparatus employing to which the lens 1 is applied.

FIG. 5 shows wavelength-dependency (109V) of reflectance for light entering at angle 0° for an antireflection coating having layer structure 1–9 applied to the lens in Inventive Sample 1, wavelength-dependency (109S) of reflectance for light entering at angle 45° and wavelength-dependency (105V) of reflectance for light entering at angle 0° for an antireflection coating having layer structure 1–5.

FIG. 6 shows wavelength-dependency (110V) of reflectance for light entering at angle 0° for an antireflection coating having layer structure 1–10 applied to the lens in Inventive Sample 2, wavelength-dependency (110S) of reflectance for light entering at angle 45° and wavelength-dependency (106V) of reflectance for light entering at angle 0° for an antireflection coating having layer structure 1–6.

FIG. 7 shows wavelength-dependency (207V) of reflectance for light entering at angle 0° for an antireflection coating having layer structure 2–7 applied to the lens in the long wavelength side (for example, 109V for 105V shown in FIG. 5).

Figure 4:
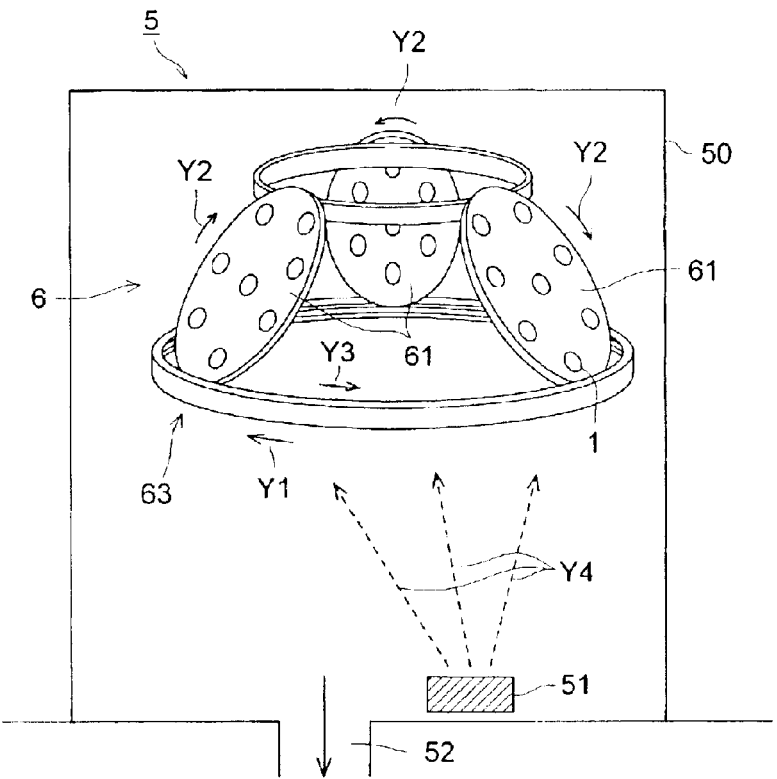
FIG. 4(a) is a schematic diagram showing an example of a vacuum deposition apparatus.
FIG. 4(b) is a longitudinal section showing a part of a base board rotating apparatus in FIG. 4(a).
Figure 4:
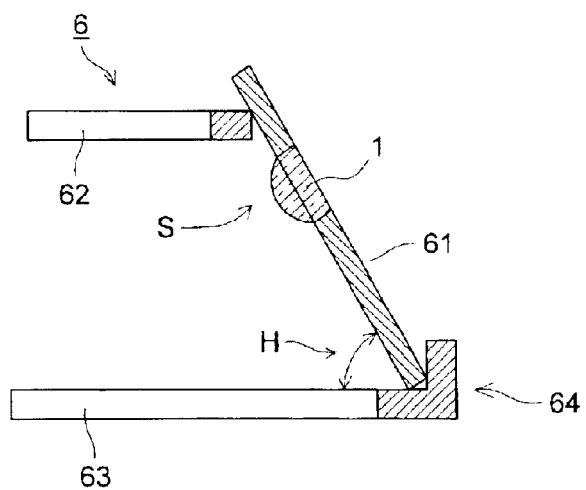

FIG. 4 shows reflectance for incident light, reflectance for emergent light and an estimated value of transmittance of the total lens on each of lens surfaces S1 and S2 which were observed when light having each wavelength of laser beam shown in Table 3 was radiated on lens surface S1 to be in parallel with optical axis L for each of lenses of Inventive Samples 1–5 and Comparative Sample. The column of "Evaluation" in Table 4 shows results of measurement for a beam spot form and an amount of light transmitted obtained when light having a wavelength of laser beam shown in Table 3 was converged by each of the lenses of Inventive Samples 1–5 and Comparative Sample.

A: Excellent in both a beam form and an amount of light
B: Excellent in a beam form
C: Unacceptable substantially

TABLE 4

|  |  | Inventive Sample 1 | Inventive Sample 2 | Inventive Sample 3 | Inventive Sample 4 | Inventive Sample 5 | Comparative Sample |
|---|---|---|---|---|---|---|---|
| S1 surface | Reflectance on lens center portion for incident light % | 0.3 | 0.1 | 0.1 | 0.1 | 2.6 | 4.0 |
| | Reflectance on lens peripheral portion for incident | 0.8 | 0.6 | 1 | 0.6 | 2.8 | 3.9 |

TABLE 4-continued

|  |  | Inventive Sample 1 | Inventive Sample 2 | Inventive Sample 3 | Inventive Sample 4 | Inventive Sample 5 | Comparative Sample |
|---|---|---|---|---|---|---|---|
| S2 surface | light %<br>Reflectance on lens center portion for emergent light % | 0.8 | 0.6 | 0.6 | 0.6 | 1.1 | 0.2 |
|  | Reflectance on lens peripheral portion for emergent light % | 0.8 | 0.9 | 0.9 | 0.7 | 3.7 | 1.8 |
| Transmittance on lens center portion % |  | 98.9 | 99.3 | 99.3 | 99.3 | 96.3 | 95.8 |
| Transmittance on lens peripheral portion % |  | 98.4 | 98.5 | 98.1 | 98.7 | 93.6 | 94.3 |
| Evaluation |  | A | A | A | A | B | C |

Table 4 indicates that an excellent beam form can be obtained by the lens in each of Inventive Samples 1–5 wherein thickness of antireflection coating 3 on peripheral portion P1 on lens surface S1 is greater than that of antireflection coating 3 on center portion C1. It is therefore understandable that it is possible to provide an objective lens that has high numerical aperture NA and is excellent in light-converging power, by applying an antireflection coating having the layer structure in each of Samples 1–5.

It is further understandable that a large capacity of information recording can be realized by applying each lens in Inventive Samples 1–5 to the optical pickup apparatus employing a laser light source with a wavelength shown to correspond to Table 3. Incidentally, in the lens of Inventive Sample 5, it is preferable to supply the shortage of an amount of transmitted light by enhancing light output of a laser light source of the optical pickup apparatus.

On the other hand, in the lens of Comparative Sample wherein thickness of antireflection coating 3 on peripheral portion P1 on lens surface S1 is smaller than that of antireflection coating 3 on center portion C1, there were observed deterioration of the beam form and a shortage of an amount of light, compared with lenses in Inventive Samples 1–5. Due to this, it was cleared that the antireflection coating having the layer structure of Comparative sample is not acceptable substantially for an objective lens with high NA, and realization of large capacity of information recording is difficult in the optical pickup apparatus employing the lens of Comparative Sample.

In Structure (1), it is therefore possible to control so that reflectance of the peripheral portion of the lens surface may not become high, even when thickness of the antireflection coating on the center portion is set so that reflectance for light on the center portion of the lens surface may be low. It is therefore possible to prevent a fall of an amount of light passing through the peripheral portion of the lens, and to improve, compared with the past, a light-converging power to make a spot diameter small and to secure an amount of light passing through the lens.

In Structure (2), it is possible to improve light-converging characteristics more in the optical lens with high NA having the lens surface on which the angle θ is relatively great, and thereby to contribute to realization of a large capacity of an optical recording medium.

In Structure (3), it is possible to prevent surely a fall of an amount of light passing through the peripheral portion of the lens, and to make a spot diameter small for certain to secure certainly an amount of light passing through the lens.

In Structure (4), an amount of light passing through a peripheral portion of the lens can be made as large as that of light passing through the center portion of the lens, which makes an amount of light passing through the total lens to be increased greatly.

In each of Structures (5) and (12), an amount of light that is emitted from the laser light source and passes through the peripheral portion of the lens can be made more, compared with the past.

In the invention described in each of Structures 6, 7, 13 and 14, a relatively large amount of light that is emitted from the laser light source and passes through the center portion of the lens can be secured.

In each of Structures (8), (10) and (15), an amount of light that is emitted from the laser light source and passes through the peripheral portion of the lens can be made more, and more amount of light that is emitted from the laser light source and passes through the center portion of the lens can be secured.

In each of Structures (9), (11) and (16), it is possible to make an amount of light that is emitted from the laser light source and passes through the peripheral portion of the lens surface where angle θ is not less than 50° to be more. In the optical lens with high NA having a lens surface on which angle θ is extremely great, therefore, it is possible to improve light-converging characteristics more and thereby to contribute to realization of a large capacity of an optical recording medium.

In Structure (17), it is possible to control a change in a lens form caused by an antireflection coating to be relatively less.

In Structure (18), a light spot diameter is made to be smaller, compared with the past, and more amount of light passing through the lens can be secured. It is therefore possible to record information on an optical recording medium on a higher density basis and to reproduce information from the optical recording medium on which information is recorded on a high density basis, thus, a large capacity of the optical recording medium can be realized.

What is claimed is:

1. An optical lens for use in an optical information recording and reproducing apparatus, the optical lens comprising:
   (a) at least one lens surface provided on at least one side of the optical lens; and
   (b) an antireflection coating provided on the at least one lens surface wherein a thickness of the antireflection coating on a peripheral portion of the lens surface on which an angle θ is 45° or more is equal to or greater than a thickness of the antireflection coating provided on a center portion of the lens surface on which the angle θ is 0°, wherein an angle formed by a normal line at a certain position on the lens surface where the antireflection coating is provided and by an optical axis is represented by θ.

2. The optical lens of claim 1, wherein the thickness of the antireflection coating is established so that a wavelength wherein reflectance for light entering at an angle of 0° for the antireflection coating on the peripheral portion of the lens surface shows the minimum value is equal to or greater than a wavelength wherein reflectance for light entering at the angle of 0° for the antireflection coating on the center portion of the lens surface shows the minimum value.

3. The optical lens of claim 1, wherein the thickness of the antireflection coating is established so that a wavelength wherein reflectance for light entering the antireflection coating on at least a part of the peripheral portion of the lens surface at an angle of 0° shows the minimum value is the same as a wavelength wherein reflectance for light entering the antireflection coating on the center portion of the lens surface at the angle of 0° shows the minimum value.

4. The optical lens of claim 1,
wherein in the case that the optical lens converges light emitted from a laser light source having at least one kind of wavelength in a wavelength range of 630–680 nm on the optical recording medium,
an antireflection coating is provided on the lens surface on the side where the light emitted from the laser light source enters, and thickness of the antireflection coating is established so that reflectance for light entering, at an angle of 0°, the peripheral portion of the lens surface where an angle θ is 45° or more shows the minimum value within a range of 630–800 nm, when the angle θ represents an angle formed by a normal line at a certain position on the lens surface on the side where light emitted from the laser light source enters and by an optical axis.

5. The optical lens of claim 4, wherein the thickness of the antireflection coating provided on the lens surface on the side where the light emitted from the laser light source enters is established so that reflectance for light entering, at the angle of 0°, the center portion of the lens surface having the angle θ of 0° shows the minimum value within a wavelength range of 580–740 nm.

6. The optical lens of claim 4, wherein an antireflection coating is provided on the lens surface on the side from which the light emerges to the optical recording medium, and thickness of the antireflection coating is established so that reflectance for light entering, at the angle of 0°, the center portion of the lens surface where the angle θ is 0° shows the minimum value within a range of 630–800 nm, when θ represents an angle formed by a normal line at a certain position on the lens surface on the side from which the light emerges and by an optical axis.

7. The optical lens of claim 4, wherein the laser light source has at least one kind of wavelength in a wavelength range of 630–650 nm,
wherein the optical lens converges light emitted from the laser light source on the optical recording medium, and
wherein an antireflection coating is provided on the lens surface on the side where light emitted from the laser light source enters, and thickness of the antireflection coating is established so that reflectance for light entering, at an angle of 0°, the peripheral portion of the lens surface where an angle θ is 45° or more shows the minimum value within a range of 660–770 nm, and the reflectance for light entering, at the angle of 0°, the center portion of the lens surface where the angle θ is 0° shows the minimum value within a range of 600–700 nm when θ represents an angle formed by a normal line at a certain position on the lens surface on the side where light emitted from the laser light source enters and by an optical axis, and an antireflection coating is provided on the lens surface on the side from which the light emerges, and thickness of the antireflection coating is established so that the reflectance for light entering, at the angle of 0°, the center portion of the lens surface where the angle θ is 0° shows the minimum value within a range of 640–740 nm.

8. The optical lens of claim 7, wherein the antireflection coating is provided on the lens surface on the side where the light emitted from the laser light source enters, and the thickness of the antireflection coating is established so that the reflectance for light entering, at the angle of 0°, the peripheral portion of the lens surface where the angle θ is 50° or more shows the minimum value within a range of 670–770 nm when θ represents an angle formed by a normal line at a certain position on the lens surface on the side where the light emitted from the laser light source enters and by an optical axis.

9. The optical lens of claim 4, wherein the laser light source has at least one kind of wavelength in a wavelength range of 650–670 nm,
wherein the optical lens converges light emitted from the laser light source on the optical recording medium, and
wherein an antireflection coating is provided on the lens surface on a side where light emitted from the laser light source enters, and thickness of the antireflection coating is established so that reflectance for light entering, at an angle of $_0$°, the peripheral portion of the lens surface where an angle θ is 45° or more shows the minimum value within a range of 660–800 nm, and reflectance for light entering, at the angle of 0 °, the center portion of the lens surface where the angle θ is 0° shows the minimum value within a range of 610–740 nm, when θ represents an angle formed by a normal line at a certain position on the lens surface on the side where light emitted from the laser light source enters and by an optical axis, and an antireflection coating is provided on the lens surface on the side from which the light emerges, and thickness of the antireflection coating is established so that reflectance for light entering, at the angle of 0°, the center portion of the lens surface where the angle θ is 0° shows the minimum value within a range of 660–740 nm.

10. The optical lens of claim 9, wherein the antireflection coating is provided on the lens surface on the side where the light emitted from the laser light source enters, and the thickness of the antireflection coating is established so that the reflectance for light entering, at the angle of 0°, the peripheral portion of the lens surface where the angle θ is 50° or more shows the minimum value within a range of 700–800 nm, when θ represents an angle formed by a normal line at a certain position on the lens surface on the side where the light emitted from the laser light source enters and by an optical axis.

11. The optical lens of claim 1,
wherein in the case that the optical lens converges light emitted from a laser light source having at least one kind of wavelength in a wavelength range of 400–450 nm on the optical recording medium, an antireflection coating is provided on the lens surface on the side where the light emitted from the laser light source enters, and thickness of the antireflection coating is established so that reflectance for light entering, at an angle of 0°, the peripheral portion of the lens surface where an angle θ is 45° or more shows the minimum value within a range of 420–520 nm, when the angle θ represents an angle formed by a normal line at a certain position on the lens surface on the side where light emitted from the laser light source enters and by an optical axis.

12. The optical lens of claim 11, wherein the thickness of the antireflection coating provided on the lens surface on the side where the light emitted from the laser light source enters is established so that reflectance for light entering, at the angle of 0°, the center portion of the lens surface having the angle θ of 0° shows the minimum value within a wavelength range of 380–490 nm.

13. The optical lens of claim 11, wherein an antireflection coating is provided on the lens surface on the side from which the light emerges to the optical recording medium, and thickness of the antireflection coating is established so that reflectance for light entering, at the angle of 0°, the center portion of the lens surface where the angle θ is 0° shows the minimum value within a range of 400–490 nm, when θ represents an angle formed by a normal line at a certain position on the lens surface on the side from which the light emerges and by an optical axis.

14. The optical lens of claim 11, wherein the laser light source has at least one kind of wavelength in a wavelength range of 400–420 nm, wherein the optical lens converges light emitted from the laser light source on the optical recording medium, and wherein an antireflection coating is provided on the lens surface on the side where light emitted from the laser light source enters, and thickness of the antireflection coating is established so that reflectance for light entering, at the angle of 0°, the peripheral portion of the lens surface where an angle θ is 45° or more shows the minimum value within a range of 420–490 nm, and the reflectance for light entering, at the angle of 0°, the center portion of the lens surface where the angle θ is 0° shows the minimum value within a range of 380–440 nm, when θ represents an angle formed by a normal line at a certain position on the lens surface on the side where light emitted from the laser light source enters and by an optical axis, and an antireflection coating is provided on the lens surface on the side from which the light emerges, and thickness of the antireflection coating is established so that the reflectance for light entering, at the angle of 0°, the center portion of the lens surface where the angle θ is 0° shows the minimum value within a range of 400–490 nm.

15. The optical lens of claim 14, wherein an antireflection coating is provided on the lens surface on the side where the light emitted from the laser light source enters, and the thickness of the antireflection coating is established so that the reflectance for light entering, at the angle of 0°, the peripheral portion of the lens surface where the angle θ is 50° or more shows the minimum value within a range of 430–490 nm, when θ represents an angle formed by a normal line at a certain position on the lens surface on the side where the light emitted from the laser light source enters and by an optical axis.

16. The optical lens of claim 1, wherein thickness of the antireflection coating on the peripheral portion of the lens surface is (1–1.5) times that of the antireflection coating on the center portion of the lens surface.

17. An optical information recording and reproducing apparatus comprising:

(a) a laser light source; and (b) the optical lens of claim 1, wherein the optical information recording and reproducing apparatus conducts at least one of recording information on the optical recording medium and reproducing information recorded on the optical recording medium, by converging light emitted from the laser light source on the optical recording medium with the optical lens.

18. The optical lens of claim 1, wherein in case that the optical lens converges light emitted from a laser light source having at least one kind of wavelength in a wavelength range of 630–680 nm on the optical recording medium, an antireflection coating is provided on the lens surface on the side where light emitted from the laser light source enters, and thickness of the antireflection coating is established so that reflectance for light entering, at an angle of 0°, the peripheral portion of the lens surface where an angle θ is 45° or more shows the minimum value within a range of 630–800 nm and the reflectance for light entering, at the angle of 0°, the center portion of the lens surface where the angle θ is 0° shows the minimum value within a range of 580–740 nm when θ represents an angle formed by a normal line at a certain position on the lens surface on the side where light emitted from the laser light source enters and by an optical axis, and an antireflection coating is provided on the lens surface on the side from which the light emerges, and thickness of the antireflection coating is established so that the reflectance for light entering, at the angle of 0°, the center portion of the lens surface where the angle θ is 0° shows the minimum value within a range of 630–800 nm.

* * * * *